United States Patent
Sadoway et al.

(10) Patent No.: US 12,412,897 B2
(45) Date of Patent: Sep. 9, 2025

(54) RECHARGEABLE BATTERY AND ELECTROLYSIS METHOD OF MAKING SAME

(71) Applicant: Pure Lithium Corporation, Charlestown, MA (US)

(72) Inventors: Donald R. Sadoway, Cambridge, MA (US); Emilie Bodoin, Boston, MA (US)

(73) Assignee: PURE LITHIUM CORPORATION, Charlestown, MA (US)

( * ) Notice: Subject to any disclaimer, the term of this patent is extended or adjusted under 35 U.S.C. 154(b) by 169 days.

(21) Appl. No.: 17/738,798

(22) Filed: May 6, 2022

(65) Prior Publication Data

US 2022/0367849 A1 Nov. 17, 2022

Related U.S. Application Data

(60) Provisional application No. 63/187,688, filed on May 12, 2021.

(51) Int. Cl.
*H01M 4/62* (2006.01)
*C25C 1/02* (2006.01)
(Continued)

(52) U.S. Cl.
CPC .............. *H01M 4/62* (2013.01); *C25C 1/02* (2013.01); *H01M 4/0402* (2013.01);
(Continued)

(58) Field of Classification Search
CPC ........ H01M 4/40; H01M 4/381; H01M 4/382; H01M 4/38; H01M 10/0564; H01M 10/0565
See application file for complete search history.

(56) References Cited

U.S. PATENT DOCUMENTS

| | | |
|---|---|---|
| 3,909,202 A | 9/1975 | Becker et al. |
| 3,953,234 A | 4/1976 | Hoffmann |
| | (Continued) | |

FOREIGN PATENT DOCUMENTS

| | | |
|---|---|---|
| CN | 110474053 A | 11/2019 |
| EP | 3547416 A1 | 10/2019 |
| | (Continued) | |

OTHER PUBLICATIONS

International Searching Authority—International Search Report, pertaining to International Application No. PCT/US2022/028179, dated Sep. 5, 2022, together with the Written Opinion of the International Searching Authority, 14 pages.

(Continued)

*Primary Examiner* — Nathanael T Zemui
(74) *Attorney, Agent, or Firm* — WILSON SONSINI GOODRICH & ROSATI

(57) ABSTRACT

A lithium metal electrode comprises a layer of lithium metal coating a conductive substrate, the layer of lithium metal having no more than five ppm of non-metallic elements by mass. The layer of lithium metal is in turn coated with a lithium ion conductive conformable polymer, thereby providing the negative electrode and the solid electrolyte for a rechargeable lithium metal battery that further includes a positive electrode. Optionally, the positive electrode includes elemental sulfur in a conductive matrix. The conformable polymer coated lithium metal electrode may be manufactured by a process involving electroplating lithium metal through a conformable polymer coated conductive substrate, for which the conformable polymer coated conductive substrate has been prepared by coating the conductive substrate in a solution of the conformable polymer followed by evaporating the solvent. Alternatively, a lithium metal electrode may be coated directly with conformable (Continued)

polymer. Rechargeable lithium batteries according to embodiments of the invention have improved cycle life and combustion resistance compared to lithium metal batteries manufactured by conventional methods.

23 Claims, 12 Drawing Sheets

(51) Int. Cl.
    *H01M 4/04*           (2006.01)
    *H01M 4/134*         (2010.01)
    *H01M 4/137*         (2010.01)
    *H01M 10/0525*     (2010.01)
    *H01M 10/0565*     (2010.01)
    *H01M 4/02*           (2006.01)

(52) U.S. Cl.
    CPC .......... *H01M 4/134* (2013.01); *H01M 4/137* (2013.01); *H01M 10/0525* (2013.01); *H01M 10/0565* (2013.01); *H01M 2004/027* (2013.01)

(56) References Cited

U.S. PATENT DOCUMENTS

| | | |
|---|---|---|
| 4,009,052 A | 2/1977 | Whittingham |
| 4,405,416 A | 9/1983 | Raistrick et al. |
| 4,546,055 A | 10/1985 | Coetzer et al. |
| 4,781,756 A | 11/1988 | Frianeza-Kullberg et al. |
| 5,558,953 A | 9/1996 | Matsui et al. |
| 8,501,339 B2 | 8/2013 | Visco et al. |
| 8,999,571 B2 | 4/2015 | Chiang et al. |
| 9,048,507 B2 | 6/2015 | Eitouni et al. |
| 9,246,159 B2 | 1/2016 | Bahr et al. |
| 9,520,627 B2 | 12/2016 | Aetukuri et al. |
| 9,705,167 B2 | 7/2017 | Khiterer et al. |
| 10,074,839 B2 | 9/2018 | Hammond-Cunningham et al. |
| 10,090,564 B2 | 10/2018 | Chung et al. |
| 10,177,366 B2 | 1/2019 | Swonger et al. |
| 10,256,448 B2 | 4/2019 | Cui et al. |
| 11,145,851 B2 | 10/2021 | Cui et al. |
| 11,251,430 B2 | 2/2022 | Siu et al. |
| 11,453,948 B2 | 9/2022 | Gallant et al. |
| 11,588,146 B2 | 2/2023 | Bodoin |
| 12,027,691 B2 | 7/2024 | Bodoin |
| 12,100,828 B2 | 9/2024 | Sadoway |
| 12,188,140 B2 | 1/2025 | Jastrzebski |
| 12,188,141 B2 | 1/2025 | Jastrzebski |
| 2001/0041294 A1 | 11/2001 | Chu et al. |
| 2002/0069278 A1 | 6/2002 | Forslow |
| 2002/0069282 A1 | 6/2002 | Reisman |
| 2005/0191545 A1* | 9/2005 | Bowles ............... H01M 4/5835 429/231.95 |
| 2009/0272650 A1 | 11/2009 | Kakuta et al. |
| 2013/0177798 A1 | 7/2013 | Ueda |
| 2013/0236764 A1 | 9/2013 | Hu et al. |
| 2014/0170303 A1 | 6/2014 | Rayner et al. |
| 2015/0014184 A1 | 1/2015 | Swonger |
| 2016/0351889 A1 | 12/2016 | Swonger et al. |
| 2017/0271639 A1 | 9/2017 | Yoshima et al. |
| 2018/0097221 A1 | 4/2018 | Swonger et al. |
| 2018/0198170 A1 | 7/2018 | Fujita et al. |
| 2018/0371632 A1 | 12/2018 | Bodoin et al. |
| 2019/0036165 A1 | 1/2019 | Zhamu et al. |
| 2019/0048483 A1 | 2/2019 | Swonger et al. |
| 2019/0051885 A1 | 2/2019 | Swonger et al. |
| 2019/0194373 A1 | 6/2019 | Ma et al. |
| 2019/0226108 A1 | 7/2019 | Swonger |
| 2019/0245251 A1 | 8/2019 | Park et al. |
| 2019/0260091 A1* | 8/2019 | Rho ................... H01M 4/0404 |
| 2019/0273258 A1 | 9/2019 | Thomas-Alyea et al. |
| 2019/0348668 A1 | 11/2019 | Kim et al. |
| 2019/0376198 A1 | 12/2019 | Dow et al. |
| 2020/0002153 A1 | 1/2020 | Delmas et al. |
| 2020/0086281 A1 | 3/2020 | Hryn et al. |
| 2020/0087806 A1 | 3/2020 | Hryn et al. |
| 2020/0091509 A1 | 3/2020 | Hryn et al. |
| 2020/0136178 A1 | 4/2020 | Ku et al. |
| 2020/0149174 A1 | 5/2020 | Swonger |
| 2020/0203705 A1 | 6/2020 | Swonger et al. |
| 2020/0203707 A1 | 6/2020 | Hellring et al. |
| 2020/0220163 A1 | 7/2020 | Li et al. |
| 2020/0274142 A1* | 8/2020 | Youn ................... H01M 4/62 |
| 2021/0091433 A1 | 3/2021 | Hammond et al. |
| 2021/0336274 A1 | 10/2021 | Jung et al. |
| 2021/0381115 A1 | 12/2021 | Kang et al. |
| 2022/0069282 A1 | 3/2022 | Bodoin |
| 2022/0166021 A1 | 5/2022 | Siu et al. |
| 2022/0223848 A1 | 7/2022 | Sadana |
| 2022/0246901 A1 | 8/2022 | Sadoway |
| 2022/0255057 A1 | 8/2022 | Sadoway |
| 2022/0267918 A1 | 8/2022 | Jastrzebski et al. |
| 2022/0367874 A1 | 11/2022 | Sadoway et al. |
| 2022/0393173 A1 | 12/2022 | Sadoway et al. |
| 2022/0393234 A1 | 12/2022 | Sadoway et al. |
| 2022/0416220 A1 | 12/2022 | Bobel et al. |
| 2023/0102679 A1 | 3/2023 | Sadoway et al. |
| 2023/0207779 A1 | 6/2023 | Bodoin |
| 2023/0395779 A1 | 12/2023 | Bodoin |
| 2025/0006886 A1 | 1/2025 | Sadoway |
| 2025/0070115 A1 | 2/2025 | Sadoway |
| 2025/0105248 A1 | 3/2025 | Bodoin |

FOREIGN PATENT DOCUMENTS

| | | |
|---|---|---|
| GB | 2526312 A | 11/2015 |
| KR | 20160052323 A | 5/2016 |
| WO | 1998016960 A2 | 4/1998 |
| WO | WO-0005774 A1 | 2/2000 |
| WO | WO-2019018386 A1 | 1/2019 |
| WO | 2022046327 A1 | 3/2022 |
| WO | 2022046328 A1 | 3/2022 |
| WO | WO-2022173578 A1 | 8/2022 |
| WO | WO-2022240696 A1 | 11/2022 |
| WO | WO-2022240768 A1 | 11/2022 |
| WO | WO-2022256685 A1 | 12/2022 |
| WO | WO-2022256692 A1 | 12/2022 |
| WO | WO-2023049353 A2 | 3/2023 |
| WO | WO-2024054984 A1 | 3/2024 |
| WO | WO-2024064686 A1 | 3/2024 |

OTHER PUBLICATIONS

Trapa et al., "Block copolymer electrolytes synthesized by atom transfer radical polymerization for solid-state, thin-film lithium batteries," Electrochemical and Solid State Letters, vol. 5, pp. A85-A88, Feb. 26, 2002.

Choudhury et al., A Highly Reversible Room-Temperature Lithium Metal Battery Based on Crosslinked Hairy Nanoparticles. Nature Communications, 9 pages (Dec. 2015).

Choudhury et al., Designer Interphases for the Lithium-Oxygen Electrochemical Cell. Sci. Adv., Apr. 19, 2017, 11 pages.

Choudhury et al., Electroless Formation of Hybrid Lithium Anodes for Fast Interfacial Ion Transport. Agnew. Chem. Int. Ed. 2017, vol. 56, pp. 13070-13077.

Co-pending U.S. Appl. No. 18/095,844, inventors Sadoway; Donald R. et al., filed Jan. 11, 2023.

Co-pending U.S. Appl. No. 18/236,257, inventor Bodoin; Emilie, filed Aug. 21, 2023.

Gannett et al., Cross-Linking Effects on Performance Metrics of Phenazine-Based Polymer Cathodes. ChemSusChem, 2020, vol. 13, pp. 2428-2435.

Harry et al., "Detection of Subsurface Structures Underneath Dendrites Formed on Cycled Lithium Metal Electrodes", Nature materials, vol. 13, Jan. 2014, pp. 69-73.

Lee et al., Dendrite-Free Lithium Deposition for Lithium Metal Anodes with Interconnected Microsphere Protection. Them. Mater., Jul. 2017, vol. 29, pp. 5906-5914.

Mashtalir et al., High-Purity Lithium Metal Films from Aqueous Mineral Solutions. ACS Omega, 2018, vol. 3, pp. 181-187.

(56) References Cited

OTHER PUBLICATIONS

Nakajima et al., Lithium Ion Conductive Glass Ceramics: Properties and Application in Lithium Metal Batteries. Symposium on Energy Storage Beyond Lithium Ion, Oak Ridge National Laboratory, pp. 1-28, Oct. 8, 2010.

Pan et al., "A review of solid-slate lithium-sulfur battery: Ion transport and polysulfide chemistry," Energy Fuels, vol. 34, pp. 11942-11961, Sep. 3, 2020.

PCT/US2021/042694 International Search Report and Written Opinion dated Nov. 4, 2021.

PCT/US2021/042696 International Search Report and Written Opinion dated Nov. 5, 2021.

PCT/US2022/028380 International Search Report and Written Opinion dated Sep. 12, 2022.

PCT/US2022/032209 International Search Report and Written Opinion dated Oct. 14, 2022.

Qian et al. Dendrite-Free Li Deposition Using Trace-Amounts of Water as an Electrolyte Additive. Nano Energy, 2015, vol. 15, pp. 135-144.

Shi, et al. The Development of Vanadyl Phosphate Cathode Materials for Energy Storage Systems: A Review. Chemistry. Jul. 2, 2020;26(37):8190-8204. doi: 10.1002/chem.201905706. Epub May 11, 2020.

Sigma-Aldrich. Certificate of Analysis. Product Name: Lithium—ribbon, thickness×W 0.38 mm×23 mm, 99.9% trace metals basis. Product No. 265985. Batch No. SHBM9629. Quality Release Date Jan. 22, 2021. Retrieved online Jul. 23, 2023 at URL: https://www.sigmaaldrich.com/certificates/COFA/26/265985/265985-BULK_SHBM9629_.pdf.

Sigma-Aldrich. Product Specification Sheet. Product Name: Lithium—ribbon, thickness×W 0.38 mm×23 mm, 99.9% trace metals basis. Product No. 265985. Retrieved online Jul. 23, 2023 at URL: https://www.sigmaaldrich.com/specification-sheets/221/584/265985-BULK_ALDRICH_.pdf.

Siu, et al. Enabling multi-electron reaction of ε-VOPO4 to reach theoretical capacity for lithium-ion batteries. Chem Commun (Camb). Jul. 10, 2018;54(56):7802-7805. doi: 10.1039/c8cc02386g.

Stalin et al., Designing Polymeric Interphases for Stable Lithium Metal Deposition. American Chemical Society, Jun. 1, 2020, 10 pages.

U.S. Appl. No. 17/006,048 Notice of Allowance dated Nov. 3, 2022.
U.S. Appl. No. 17/006,048 Office Action dated Apr. 7, 2022.
U.S. Appl. No. 17/006,073 Office Action dated May 4, 2023.
U.S. Appl. No. 17/006,073 Office Action dated Nov. 10, 2022.
U.S. Appl. No. 18/236,257 Office Action dated Oct. 23, 2023.

Whittingham, et al. Can Multielectron Intercalation Reactions Be the Basis of Next Generation Batteries? Acc Chem Res. Feb. 20, 2018;51(2):258-264. doi: 10.1021/acs.accounts.7b00527. Epub Jan. 12, 2018.

Zhang, et al. Pushing the limit of 3d transition metal-based layered oxides that use both cation and anion redox for energy storage. Nat Rev Mater 7, 522-540 (2022). https://doi.org/10.1038/s41578-022-00416-1.

Zhao et al., Solid-State Polymer Electrolytes with In-Built Fast Interfacial Transport for Secondary Lithium Batteries.—Nature Energy, vol. 4, May 2019, pp. 365-373.

U.S. Appl. No. 17/006,073 Requirement for Restriction dated Jul. 27, 2022.

Aetukuri, N.B. et al., Flexible Ion-Conducting Composite Membranes for Lithium Batteries. Advanced Energy Materials 5:1500265, 6 pages (2015).

Bertrand, M. et al., Compatibility assessment of solid ceramic electrolytes and active materials based on thermal dilatation for the development of solid-state batteries, Material Advances 2:2989-2999 (2021).

Bian, P. et al., Rediscovering Silicones: The Anomalous Water Permeability of 'Hydrophobic' PDMS Suggests Nanostructure and Applications in Water Purification and Anti-Icing, Macromolecular Rapid Communications 42(5) (2021), abstract only, https://onlinelibrary.wiley.com/doi/abs/10.1002/marc.202000682.

Cai, H. et al., Microstructure and ionic conductivities of NASICON-type Li1.3Al0.3Ti1.7(PO4)3 solid electrolytes produced by cold sintering assisted process. Journal of Alloys and Compounds 939:168702 (pp. 1-12) (2023).

Conway, B. et al., Flexible Lithium-Ion Conducting Composite Electrolyte. Batteries and Supercaps 3:653-657 (2020) (Abstract Only) https://chemistry-europe.onlinelibrary.wiley.com/doi/10.1002/batt.201900212.

Co-pending U.S. Appl. No. 18/805,067, inventor Sadoway; Donald R., filed Aug. 14, 2024.

Co-pending U.S. Appl. No. 18/824,719, inventor Sadoway; Donald R., filed Sep. 4, 2024.

Jiang, W. et al., Improvement of the Interface between the Lithium Anode and a Garnet-Type Solid Electrolyte of Lithium Batteries Using an Aluminum-Nitride Layer, Nanomaterials 12:2023 (pp. 1-12) (2022).

Lacivita, V. et al., Structural and Compositional Factors That Control the Li-Ion Conductivity in LiPON Electrolytes, Chemistry of Materials 30:7077-7090 (2018).

Molenda, J. et al., Structural, Transport and Electrochemical Properties of LiFePO4 Substituted in Lithium and Iron Sublattices (Al, Zr, W, Mn, Co and Ni), Materials 6(5):1656-1687 (2013).

Mozammal Raju, M. et al., Crystal Structure and Preparation of Li7La3Zr2O12 (LLZO) Solid-State Electrolyte and Doping Impacts on the Conductivity: An Overview, Electrochem 2:390-414 (2021).

MSE Supplies, We Enable Innovation, MSE Pro Solid Electrolyte LATP 300 nm Poweder Lithium Aluminum Titanium Phosphate, https://www.msesupplies.com/products/ampcera-solid-electrolyte-latp-300-nm-powder-lithium-aluminum-titanium-phosphate?variant=31032808079418, last accessed on Nov. 2, 2023.

Ohara, Inc., Lithium Ion Conductive Glass Ceramics: Properties and Application in Lithium Metal Batteries, Symposium on Energy Storage Beyond Lithium Ion; Materials Perspective, Oct. 7-8, 2010, Oak Ridge National Laboratory, Kousuke Nakajima, 28 pages (Oct. 8, 2010).

Park, M. et al., A review of conduction phenomena in Li-ion batteries, Journal of Power Sources 195(24):7904-7929 (2010).

U.S. Appl. No. 18/236,257 Office Action dated Jun. 18, 2024.

Wang, M.J. et al., Mixed Electronic and Ionic Conduction Properties of Lithium Lanthanum Titanate, Advanced Functional Materials 30(10):1909140 (2020).

Zhang, T. et al., Aqueous Lithium/Air Rechargeable Batteries, Chemical Letters 40:668-673 (2011).

Co-pending U.S. Appl. No. 18/657,599, inventor Bodoin; Emilie, filed May 7, 2024.

Co-pending U.S. Appl. No. 18/942,105, inventor Sadoway; Donald R., filed Nov. 8, 2024.

Dong, Yongteng. et al. Unveiling the adsorption tendency of film-forming additives to enable fast-charging hard carbon anodes with regulated Li plating. Energy & Environmental Science 17(7):2500-2511 (2024).

Fan, Huailin. et al. Flower-like carbon cathode prepared via in situ assembly for Zn-ion hybrid supercapacitors. Carbon 180:254-264 (2021).

Gong, Huaxin. et al. An emerging class of carbon materials: Synthesis and applications of carbon flowers. Matter 6(7):2206-2234 (2023).

Gong, Huaxin. et al. Carbon flowers as electrocatalysts for the reduction of oxygen to hydrogen peroxide. Nano Research 16(9):11556-11563 (2023).

Gong, Huaxin. et al. Fast-charging of hybrid lithium-ion/lithium-metal anodes by nanostructured hard carbon host. ACS Energy Letters 7(12):4417-4426 (2022).

Guo, Daying. et al. Controllable synthesis of highly uniform flower-like hierarchical carbon nanospheres and their application in high performance lithium-sulfur batteries. Journal of Materials Chemistry A 5(13):6245-6256 (2017).

Tan, Suchong. et al. The progress of hard carbon as an anode material in sodium-ion batteries. Molecules 28(7):3134, 1-21 (2023).

Tsao, Yuchi. et al. A nickel-decorated carbon flower/sulfur cathode for lean-electrolyte lithium-sulfur batteries. Advanced Energy Materials 11(36):2101449, 1-8 (2021).

(56) References Cited

OTHER PUBLICATIONS

U.S. Appl. No. 17/006,073 Notice of Allowance dated Apr. 16, 2024.
U.S. Appl. No. 17/581,517 Notice of Allowance dated Jun. 11, 2024.
U.S. Appl. No. 17/581,517 Notice of Allowance dated Jun. 5, 2024.
U.S. Appl. No. 18/236,257 Office Action dated Dec. 27, 2024.
U.S. Appl. No. 18/824,719 Office Action dated Dec. 26, 2024.
Wang, Jun. et al. Intercalated Co (OH) 2-derived flower-like hybrids composed of cobalt sulfide nanoparticles partially embedded in nitrogen-doped carbon nanosheets with superior lithium storage. Journal of Materials Chemistry A 5(7):3628-3637 (2017).
Wang, Shuhui. et al. The application of hard carbon with internal quasi-lithium metal deposition in high-energy Li-ion/Li-metal hybrid batteries. Electrochimica Acta 468:143194, 1-11 (2023).
Yuan, Qiong. et al. Polysulfides anchoring and enhanced electrochemical kinetics of 3D flower-like FeS/carbon assembly materials for lithium-sulfur battery. Applied Surface Science 508:145286, 1-9 (2020).
U.S. Appl. No. 18/824,719 Office Action dated Apr. 18, 2025.
U.S. Appl. No. 18/942,105 Office Action dated Apr. 10, 2025.
U.S. Appl. No. 18/942,105 Office Action dated Feb. 26, 2025.
U.S. Appl. No. 18/942,105 Office Action dated Jan. 26, 2025.

\* cited by examiner

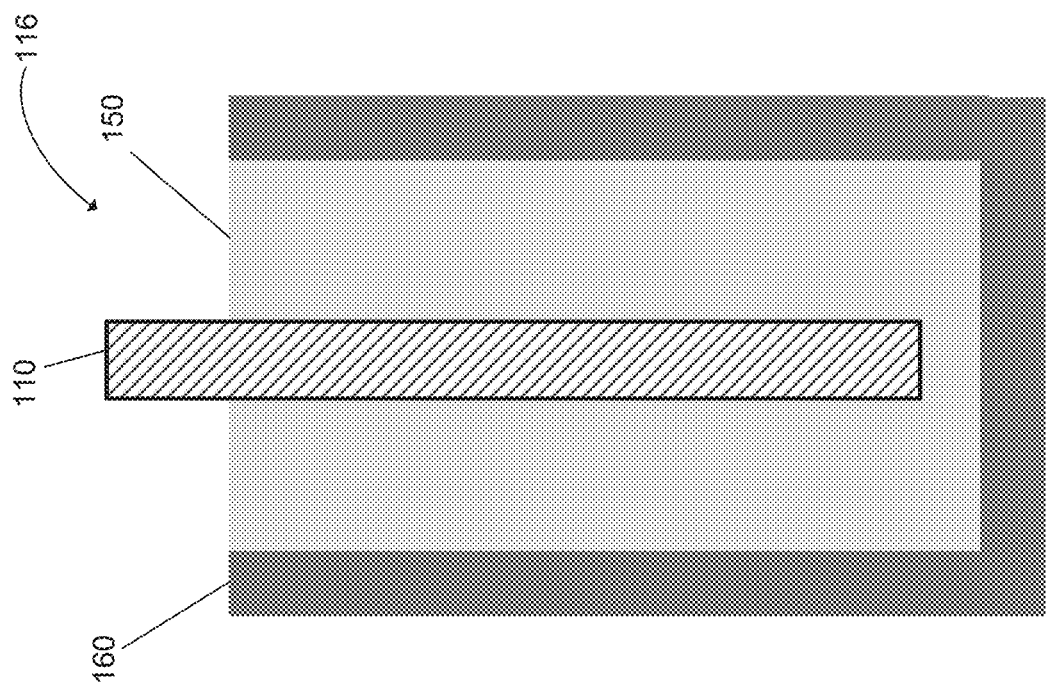
*Fig. 4a*
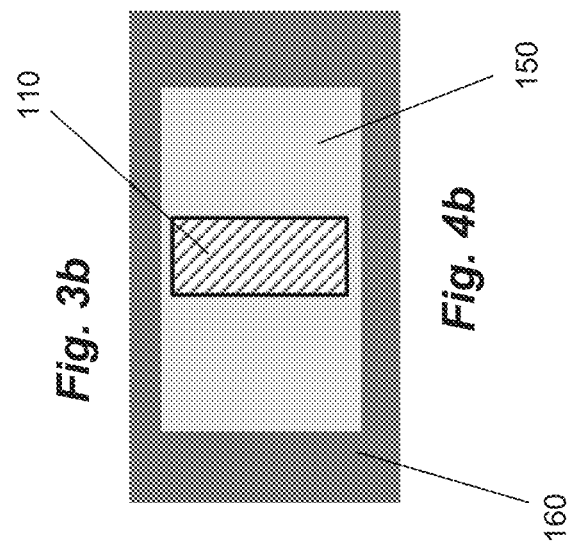
*Fig. 3b*
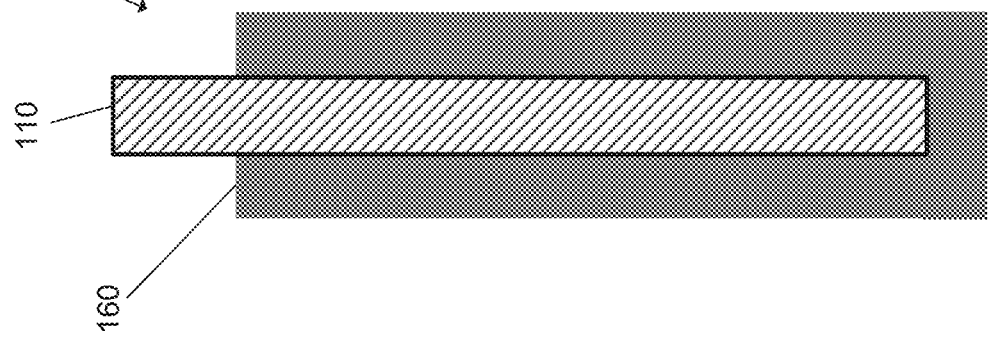
*Fig. 3a*
*Fig. 4b*

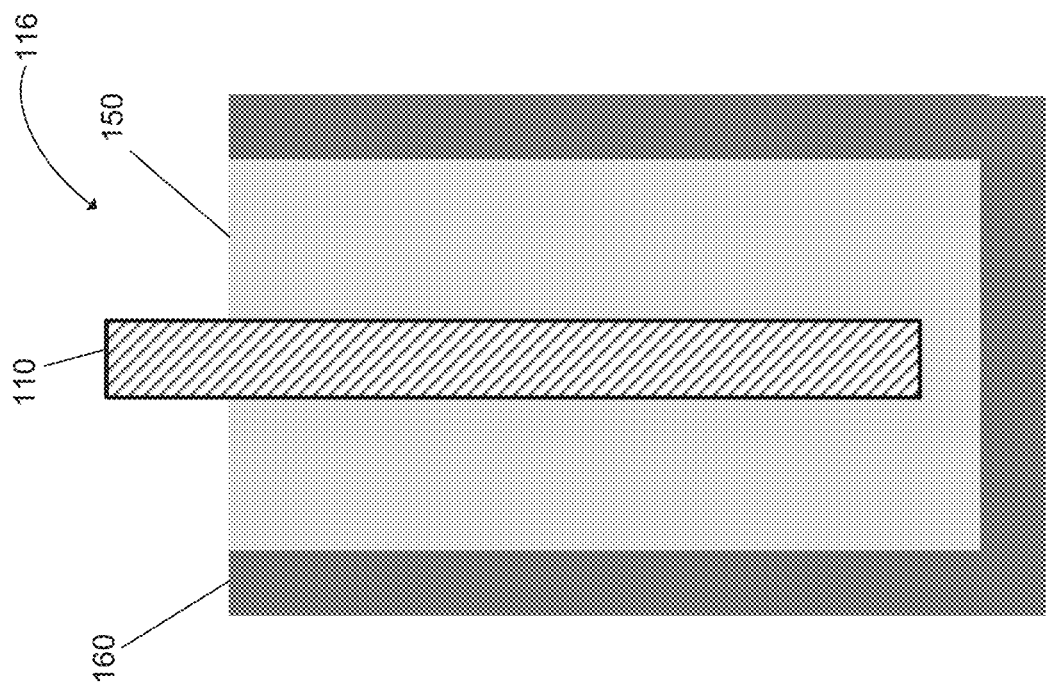
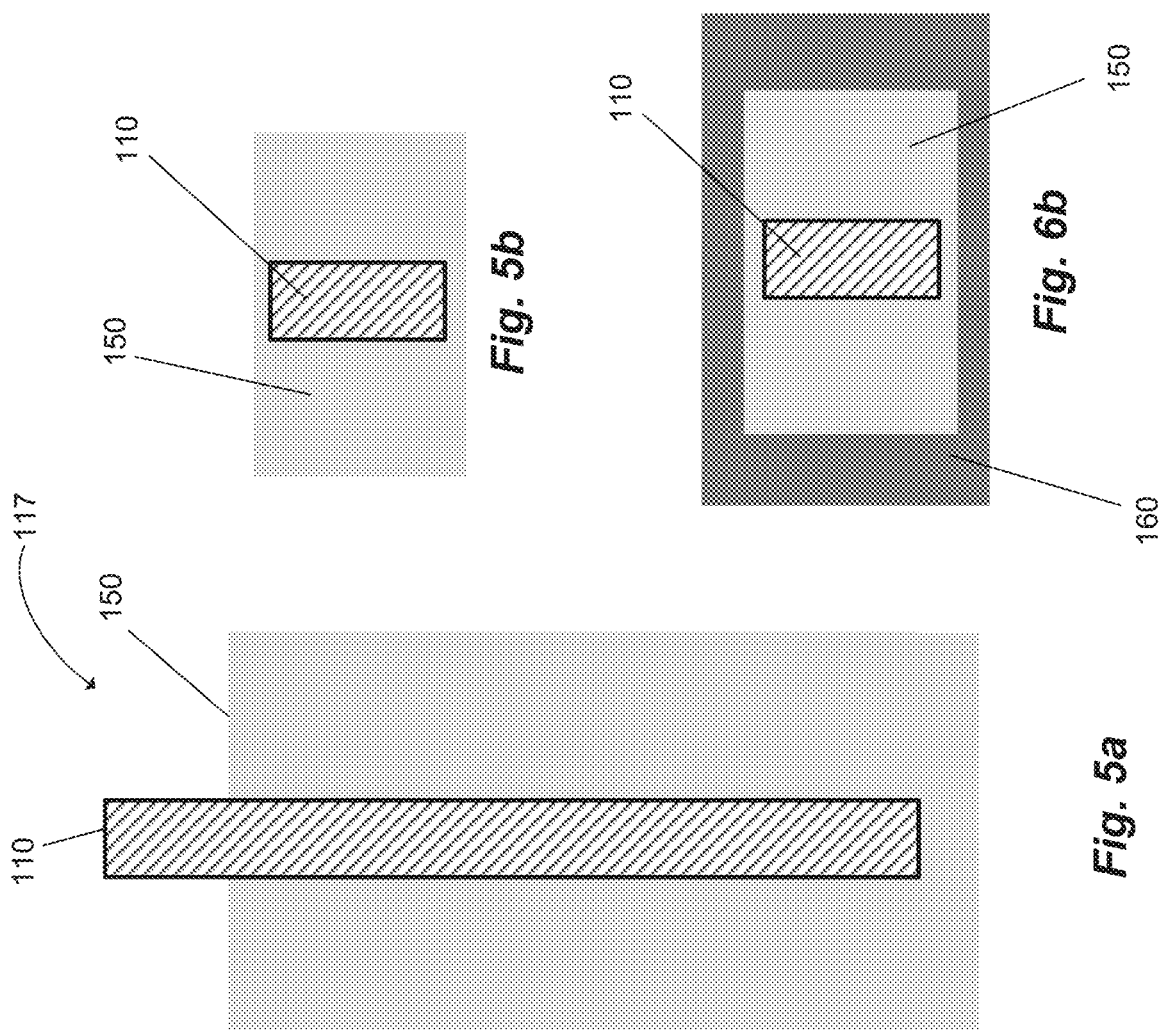
Fig. 5a
Fig. 5b
Fig. 6a
Fig. 6b

RECHARGEABLE BATTERY AND ELECTROLYSIS METHOD OF MAKING SAME

CROSS-REFERENCE TO RELATED APPLICATIONS

This patent application claims the benefit of U.S. Provisional Patent Application No. 63/187,688 filed May 12, 2021, the disclosure of which is incorporated by reference herein in its entirety.

TECHNICAL FIELD

The present invention relates to the manufacture of lithium metal rechargeable batteries using polymeric solid state electrolytes. The resultant batteries are safer and have increased cycle life compared to lithium metal batteries manufactured by conventional methods.

BACKGROUND ART

Lithium ion batteries (LIBs) dominate the lithium battery market. LIBs contain no metallic lithium present as such. The negative electrode comprises a carbon host for neutral lithium which is contained therein. In the electrolyte and in the positive electrode lithium is present only as the ion. Such batteries are attractive for their high energy density compared to that of other rechargeable batteries and for their ability to operate over multiple charge/discharge cycles. In lithium metal batteries (LMBs) by contrast the negative electrode comprises metallic lithium, just as in lead-acid batteries the negative electrode comprises metallic lead. During discharge of an LMB, lithium metal dissociates to form lithium ions and electrons. The lithium ions migrate through the electrolyte to the positive electrode. The electrons flow through an external circuit where they power a device. As the LMB recharges, lithium ions are reduced back to lithium metal as electrons flow back into the negative electrode. Because LMBs have intrinsically higher capacity than LIBs, they are the preferred technology for primary batteries. Moreover, since LMBs can be manufactured in the fully charged state, they do not require the lengthy formation process needed for LIBs However, poor cycle life, volumetric expansion, and safety concerns relating to shorts resulting from dendrite formation and the potential for violent combustion of the flammable organic electrolytes used in LMBs have limited their practical use as rechargeable batteries.

Lithium metal batteries using sulfur as the positive electrode offer higher specific capacity than the lithium intercalation compounds that currently dominate the market. However, complex polysulfide species produced upon the reduction of elemental sulfur are soluble in the organic electrolytes typically used in lithium batteries, resulting in reduced cycle life due to the "polysulfide shuttle" effect.

A novel rechargeable lithium metal battery and methods to produce the same are needed to improve the cycle life and enhance the safety profile of rechargeable lithium metal batteries, in particular lithium metal batteries using elemental sulfur in the positive electrode.

SUMMARY OF THE EMBODIMENTS

According to some embodiments a lithium metal electrode is disclosed, the lithium metal electrode including a conductive substrate, a layer of lithium metal coating the conductive substrate, the layer of lithium metal having an inner face and an outer face, the inner face contacting the conductive substrate, wherein the layer of lithium metal has no more than five ppm of non-metallic elements by mass. In some embodiments, the layer of lithium metal has no more than one ppm of non-metallic elements by mass. In some embodiments, a lithium ion conductive conformable polymer coats the outer face of the layer of lithium metal, the lithium ion conductive conformable polymer being configured to selectively allow lithium ions to electrophorese through the polymer under an applied voltage when the lithium metal electrode is immersed in a solution containing a lithium salt dissolved in a solvent.

In some embodiments, the solvent is likewise unable to pass through the lithium ion conductive conformable polymer to make contact with the layer of lithium metal. In some such embodiments, the solvent is water.

In some embodiments, the lithium ion conductive conformable polymer is a block or graft copolymer, with microphase separated first domains and second domains, each domain above its respective glass transition temperature, $T_g$, the first domains formed from first segments, the first segments configured to solvate lithium ions and to provide continuous conductive pathways for the transport of lithium ions and the second domains formed from second segments immiscible with the first segments. In some embodiments the first segments comprise poly(oxyethylene)$_n$ side chains, where n is an integer between 4 and 20.

In some embodiments the lithium ion conductive conformable polymer is a block copolymer. For some such block copolymers, the second segments comprise poly(alkyl methacrylate). In some embodiments, the block copolymer is poly[(oxyethylene)$_9$ methacrylate]-b-poly(butyl methacrylate) (POEM-b-PBMA). For some such embodiments, the ratio of POEM to PBM is between 55:45 and 70:30 on a molar basis.

In some embodiments the lithium ion conductive conformable polymer is a graft copolymer. For some such graft copolymers, the second segments comprise poly(dimethyl siloxane). According to some embodiments, the graft copolymer is poly[(oxyethylene)$_9$ methacrylate]-g-poly(dimethyl siloxane).

In accordance with embodiments of the invention, a rechargeable lithium metal battery is disclosed which includes a positive electrode and a negative electrode. The negative electrode has a conductive substrate coated with a layer of lithium metal, the layer of lithium metal having an inner face and an outer face, the inner face contacting the conductive substrate, the layer of lithium metal having no more than 5 ppm of non-metallic elements by mass. In some embodiments, the layer of lithium metal has no more than 1 ppm of non-metallic elements by mass. A lithium ion conductive conformable polymer coats the outer face of the layer of lithium metal, the lithium ion conductive conformable polymer being disposed between the negative electrode and the positive electrode. The lithium ion conductive conformable polymer selectively allows lithium ions to electrophorese under an applied voltage, and for some embodiments prohibits any solvent that is present from making contact with the layer of lithium metal. In some embodiments, the conformable polymer of the rechargeable lithium metal battery is in direct physical contact with both the layer of lithium metal and the positive electrode, and is configured to adjust to volume changes of the positive and negative electrodes so as to maintain direct physical contact with both the layer of lithium metal and the positive electrode, and to function as a solid state electrolyte during both charging and discharging of the rechargeable battery.

In some embodiments of the rechargeable lithium metal battery, the lithium ion conductive conformable polymer is a block or graft copolymer, with microphase separated first domains and second domains, each domain above its respective glass transition temperature, $T_g$, the first domains formed from lithium ion solvating segments and providing continuous conductive pathways for the transport of lithium ions and the second domains formed from second segments immiscible with the first segments.

In some embodiments of the invention, a rechargeable lithium metal battery is disclosed, the battery having a positive electrode including elemental sulfur, a negative electrode having a conductive substrate coated with a layer of lithium metal, the layer of lithium metal having an inner face and an outer face, the inner face contacting the conductive substrate, and a lithium ion conductive conformable polymer coating the outer face of the layer of lithium metal, the lithium ion conductive conformable polymer being disposed between the negative electrode and the positive electrode. For such a rechargeable lithium metal battery, the lithium ion conductive conformable polymer selectively allows lithium ions to electrophorese through the polymer under an applied voltage, but prohibits polysulfides from passing through the lithium ion conductive conformable polymer and making contact with the layer of lithium metal. In some embodiments, the lithium ion conductive conformable polymer prohibits any solvent that is present from making contact with the layer of lithium metal. In some embodiments the lithium ion conductive conformable polymer is a block or graft copolymer, with microphase separated first domains and second domains, each domain above its respective glass transition temperature, $T_g$, the first domains formed from first segments, the first segments configured to solvate lithium ions and to provide continuous conductive pathways for the transport of lithium ions and the second domains formed from second segments immiscible with the first segments. In some embodiments the conformable polymer is in direct physical contact with both the layer of lithium metal and the positive electrode, and is configured to adjust to volume changes of the positive and negative electrodes so as to maintain direct physical contact with both the layer of lithium metal and the positive electrode, and to function as a solid state electrolyte during both charging and discharging of the rechargeable battery. In some embodiments the layer of lithium metal has no more than five ppm of non-metallic elements by mass.

In some embodiments of the invention, a process for extracting lithium metal from a lithium salt solution is disclosed, the method including the steps of:
1. preparing an electrolytic cell with a cathode and an anode, and an electrolyte solution including a lithium salt and a solvent, interposed between the anode and the cathode, wherein the cathode is a first conductive substrate coated with a layer of lithium ion conductive conformable polymer;
2. applying a voltage across the cathode and the anode, thereby depositing a layer of lithium metal on the surface of the first conductive substrate, sandwiched between the first conductive substrate and the layer of lithium ion conductive conformable polymer, the layer of lithium ion conductive conformable polymer adjusting shape to maintain contact with the growing layer of lithium metal, thereby forming a lithium metal layer on the surface of the conductive substrate, sandwiched between the conductive substrate and the lithium ion conductive conformable polymer.

According to some aspects of the invention, the above process is used to manufacture a lithium metal electrode coated with lithium ion conductive conformable polymer. For some such lithium metal electrodes, the lithium ion conductive conformable polymer is a block or graft copolymer, with microphase separated first domains and second domains, each domain above its respective glass transition temperature, $T_g$, the first domains formed from lithium ion solvating segments and providing continuous conductive pathways for the transport of lithium ions and the second domains formed from second segments immiscible with the first segments.

According to some embodiments of the process, the lithium ion conductive conformable polymer is a block or graft copolymer, with microphase separated first domains and second domains, each domain above its respective glass transition temperature, $T_g$, the first domains formed from lithium ion solvating segments and providing continuous conductive pathways for the transport of lithium ions and the second domains formed from second segments immiscible with the first segments. According to some embodiments of the process, the solvent is water. According to some embodiments, the solvent is a molten salt. According to some embodiments the anode includes lithium metal. According to some embodiments of the process, the electrolyte solution is continuously supplied by a flow cell. In some embodiments, during the manufacturing process the contents of the electrolytic cell are covered by a blanketing atmosphere, the blanketing atmosphere having no more than 10 ppm of lithium reactive components on a molar basis.

According to some aspects of the invention, a process is disclosed for purifying lithium metal, the process including the steps of:
1. configuring an electrolytic cell with a cathode and an anode, wherein the cathode is a conductive substrate, and wherein the anode comprises impure lithium metal;
2. separating and surrounding the cathode and the anode with a lithium ion conducting elastomer, the lithium ion conducting elastomer having lithium salt dispersed therein;
3. applying a voltage across the electrodes, causing the layer of impure lithium metal to decrease in thickness as a layer of purified lithium metal is electroplated on the surface of the conductive substrate, wherein the lithium ion conductive conformable polymer selectively allows lithium ions to electrophorese through the polymer under the applied voltage, wherein as lithium metal leaves the anode and plates onto the cathode, the lithium ion conducting elastomer adjusts shape to maintain contact with the layer of impure lithium metal and with the layer of purified lithium metal, and wherein the layer of purified lithium metal has a higher weight fraction of lithium metal than the layer of impure lithium metal.

BRIEF DESCRIPTION OF THE DRAWINGS

The foregoing features of embodiments will be more readily understood by reference to the following detailed description, taken with reference to the accompanying drawings, in which:

FIG. 1 illustrates the structural features of block and graft copolymers.

FIG. 3a provides a cross-sectional view of a copolymer coated conductive substrate prior to electroplating lithium metal onto the substrate according to embodiments of the invention.

FIG. 3b provides a top view of a copolymer coated conductive substrate prior to electroplating lithium metal onto the substrate according to embodiments of the invention.

FIG. 4a provides a cross-sectional view of the conductive substrate of FIGS. 3a and 3b after electroplating lithium metal onto the substrate to form a lithium metal layer sandwiched between the conductive substrate and the copolymer coating according to embodiments of the invention.

FIG. 4b provides a top view of the conductive substrate of FIG. 4a according to embodiments of the invention.

FIG. 5a provides a cross-sectional view of a lithium metal coated conductive substrate prior to coating with copolymer according to embodiments of the invention.

FIG. 5b provides a top view of a lithium metal coated conductive substrate prior to coating with copolymer according to embodiments of the invention.

FIG. 6a provides a cross-sectional view of the lithium metal coated conductive substrate of FIGS. 5a and 5b after coating with copolymer according to embodiments of the invention.

FIG. 6b provides a top view of the lithium metal coated conductive substrate of FIGS. 5a and 5b after coating with copolymer according to embodiments of the invention.

DETAILED DESCRIPTION OF SPECIFIC EMBODIMENTS

Figure 2:
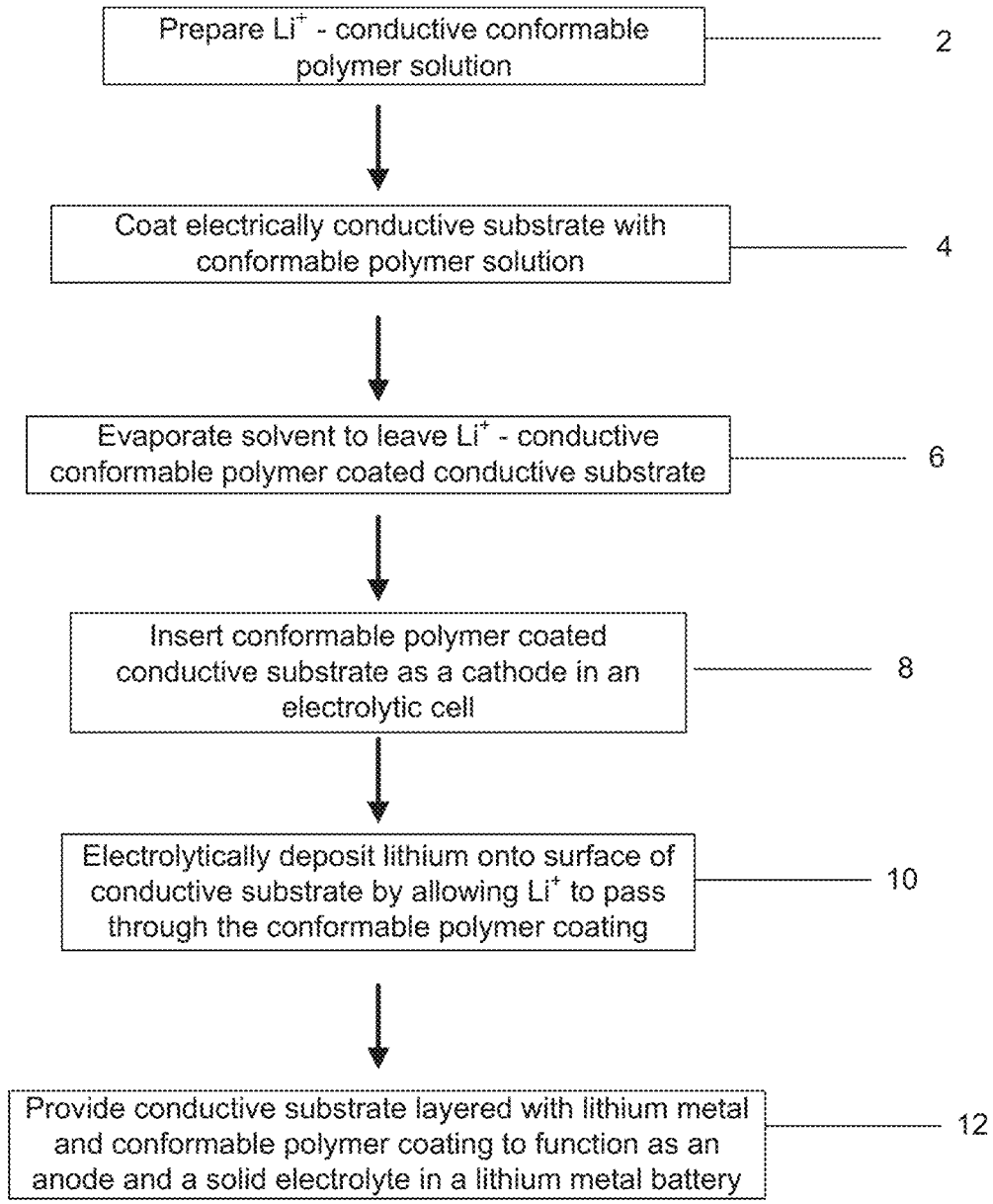
FIG. 2 shows steps in manufacturing a rechargeable lithium metal battery with a copolymer coated lithium negative electrode according to embodiments of the invention.

Definitions. As used in this description and the accompanying claims, the following terms shall have the meanings indicated, unless the context otherwise requires:

A "solid electrolyte" is material that is solid at the operating temperature of an electrolytic or galvanic cell, and which allows ion transport between electrodes of the electrolytic or galvanic cell.

As used herein, a "conformable polymer" is an amorphous viscoelastic polymer above its glass transition temperature, capable of extensive molecular rearrangement, allowing the polymer to stretch and retract in response to macroscopic stress. When present as a coating on a substrate, such a conformable polymer can shrink and expand to adapt to volume changes of the substrate, while continuing to coat the substrate.

A "block copolymer" is a polymer with blocks made up of one monomer alternating with blocks of another monomer along a linear polymer strand.

A "graft copolymer" is a polymer which has a backbone strand made up of one type of monomer and branches of a second monomer.

A "segment" is a block for a block copolymer and a side chain or backbone for a graft copolymer.

"Microphase separation" of a block or graft copolymers occurs when polymer chains segregate into domains according to their monomeric units.

A "cosolvent" for different monomers is a solvent capable of dissolving each of the different segments of a block or graft copolymer.

A "common solvent" is identical with a "cosolvent."

A "negative electrode" functions as an anode in a galvanic cell and as a cathode in an electrolytic cell.

A "positive electrode" functions as a cathode in a galvanic cell and as an anode in an electrolytic cell.

To "electrophorese" an ion is to transport the ion by means of an applied voltage.

The following abbreviations are used:
$LiCF_3SO_3$, lithium triflate;
LiFSI, lithium bis(fluorosulfonyl) imide;
LiTFSI, lithium bis(trifluoromethanesulfonyl) imide;
LiBOB, lithium bis(oxalate) borate;
LiF, lithium fluoride;
$LiPF_6$, lithium hexafluorophosphate; and
$LiNO_3$, lithium nitrate.

The tendency for lithium metal batteries to form dendrites can lead to electrical shorting. The common use of flammable organic electrolytes for such batteries exacerbates the potential of such shorts to lead to fires and explosions. Solid electrolytes have potential for eliminating these safety concerns by reducing dendrite formation and by avoiding the use of flammable organic electrolytes.

The ideal solid electrolyte has the ion transport properties of a liquid, the ability to selectively transport desired ionic species, while blocking the transport of undesirable species. The ideal solid electrolyte has low flammability, and a resistance to dendrite formation. The ideal solid electrolyte has the mechanical properties of a solid, but can undergo molecular rearrangements to grow, to shrink, and to accommodate volume changes associated with positive and negative electrodes while still maintaining physical contact with both positive and negative electrodes.

Lithium sulfur (Li—S) batteries using sulfur as the positive electrode offer higher specific capacity than the lithium intercalation compounds that currently dominate the market. However, complex polysulfide species produced upon the reduction of elemental sulfur dissolve in the organic electrolytes typically used in lithium batteries, resulting in reduced cycle life due to the "polysulfide shuttle" effect.

Consequently, another desirable feature of a solid electrolyte for lithium metal batteries is the ability to block the "polysulfide shuttle" between the positive and negative electrodes that reduces battery performance and cycle life of Li—S batteries.

According to an embodiment of the invention, a layer of a conformable polymer, doped with lithium salts, may approach ideal solid electrolyte behavior. In such an embodiment, the conformable polymer layer acts selectively to allow the electrophoresis of lithium ions while blocking the electrophoresis of other ions. According to some embodiments, solvent is also blocked from transporting through the conformable polymer layer. According to some embodiments, the conformable polymer is a block or graft copolymer.

As illustrated in FIG. 1, conformable block copolymers 5 of embodiments of the invention have alternating blocks of monomer units, here designated by type "A" and type "B" monomers. In contrast graft copolymer 15 embodiments have a backbone made up of type "A" monomers and side-chains of type "B" monomers. The block copolymer 5 of FIG. 1 is a di-block polymer (AB) with one block of A and one block of B. In other embodiments, block copolymers can be tri-block (ABA or BAB) or multi-block copolymers.

Block copolymers with blocks of immiscible groups and graft copolymers with immiscible backbone and side-chain segments as embodied in this application are conformable polymers that provide a solid electrolyte with the ion transport properties of a liquid, and with the ability to preferentially transport desired ionic species, while blocking the transport of undesirable species. The thus embodied solid electrolyte has low flammability, and a resistance to dendrite formation. The thus embodied solid electrolyte has the mechanical properties of a solid, but can undergo molecular rearrangements to grow, to shrink, and to accommodate volume changes associated with positive and negative electrodes while still maintaining physical contact with both positive and negative electrodes.

Consequently, conformable polymers with the ability to selectively electrophorese lithium ions, including in particular block copolymers with blocks of immiscible groups and graft copolymers with immiscible backbone and side-chain segments as embodied in this application provide a solid electrolyte technology for lithium metal batteries in general and Li—S batteries in particular, promising improved safety and performance, longer battery life, and a solution to the "polysulfide shuttle" problem. In short, conformable polymers that selectively allow lithium ion transport, in particular block copolymers and graft copolymers as embodied in this application provide the key features of an ideal solid electrolyte for lithium metal batteries.

A lithium ion conducting conformable polymer comprising a block or graft copolymer as embodied in this application has one or more "A" segments of lithium salt solvating polymers interspersed with one or more "B" segments of polymers, the A and the B segments being immiscible with one another. All segments are above their respective glass transition temperatures, $T_g$. Material incorporating such a block or graft copolymer will microphase separate into locally segregated nanoscale domains of "A" and "B" segments. The resultant ordering of segments in turn confers conformational rigidity to the material even though all of the constituents are segmentally liquid. For suitable A:B ratios, the A segments form continuous lithium ion solvating channels. For lithium ion solvating chains having suitably high local chain mobility, high lithium conductivity allows the directed flow of lithium ions through the conformable polymer upon application of an electric field.

For some embodiments, both A and B segments are capable of lithium ion solvation, and lithium ion solvating channels can extend through both microphase separated regions.

Dissolving a lithium ion solvating conformable polymer and a lithium salt in a suitable solvent allows ready processing of the polymer by conventional coating methods. For conformable polymers that are block or graft copolymers, a suitable solvent is a cosolvent (common solvent) that is capable of dissolving both A and B segments as well as the lithium salt. In this manner, electrodes can be directly coated with lithium ion doped conformable polymer electrolyte by dipping the electrode in solution of the conformable polymer and a suitable lithium salt, and allowing the solvent to evaporate. Alternatively, electrodes can be prepared by spin-coating an electrode with the solution of conformable polymer and lithium salt.

Such an electrode can then be directly used in a battery or electrolytic cell. In this manner, as described below, lithium metal electrodes can be coated with lithium ion conducting conformable polymers, including block or graft copolymer solid electrolytes for use in solid state batteries. Suitable lithium salts useful in preparing the lithium-doped, conformable polymer coated electrode include but are not limited to LiFSI, LiTFSI, LiBOB, LiF, $LiPF_6$, $LiNO_3$, and combinations thereof.

Block copolymers suitable as lithium ion conductive conformable polymers include di-block copolymers (AB), tri-block copolymers (ABA or BAB), or higher multiblock polymers with alternating A and B blocks, wherein all blocks are above their respective glass transition temperatures. In some embodiments, the A segments incorporate short poly (oxyethylene)$_n$ side chains, where n, the number of oxyethylene groups in the side chain ranges from 4 to 20, preferably between 7 and 11. In some embodiments n is equal to nine. In some embodiments the poly(oxyethylene)$_n$ side chains are incorporated by polymerization of poly(oxyethylene)$_n$ methacrylate monomers. In a preferred embodiment, the A segments are synthesized by polymerization of poly (oxyethylene)$_9$ methacrylate monomers.

In some embodiments, the B segments have alkyl side chains having from 3 to 6 carbons. In some embodiments, the B segments are synthesized from a poly(alkyl methacrylate). In some embodiments, the poly(alkyl methacrylate) is chosen from the group consisting of poly(propyl methacrylate), poly(butyl methacrylate), poly(pentyl methacrylate), and poly(hexyl methacrylate). In a preferred embodiment, the poly(alkyl methacrylate) is poly(butyl methacrylate).

In some embodiments the "A" segments incorporate a mixture of neutral and anionic groups. In some such embodiments, the anionic groups are configured in order to minimize coordination of the anionic groups with lithium cations.

In an embodiment, the conformable polymer is the diblock copolymer poly[(oxyethylene)$_9$ methacrylate]-b-poly(butyl methacrylate) (POEM-b-PBMA).

In some embodiments, the block copolymers are synthesized by living anionic polymerization. In some embodiments, the block copolymers are synthesized by atom transfer radical polymerization (ATRP).

In some embodiments, the conformable polymer is a graft copolymer with a backbone of "A" segments that are lithium salt solvating and side-chains of "B" segments that are immiscible with the "A" segments. Each segment is above its respective glass transition temperature.

In a preferred embodiment, the conformable polymer is a graft copolymer with backbone "A" segments incorporating short poly(oxyethylene)$_n$ side chains, where n, the number of oxyethylene groups in the side chain ranges from 4 to 20, preferably between 7 and 11. In some embodiments, n is equal to nine. In some embodiments, the poly(oxyethylene)$_n$ side chains are incorporated by polymerization of poly(oxyethylene)$_n$ methacrylate monomers. In a some embodiments, the A segments are synthesized by polymerization of poly(oxyethylene)$_9$ methacrylate monomers.

In some embodiments, the polymer is a graft copolymer with side chain "B" segments incorporating poly(dimethyl siloxane) (PDMS). In some embodiments, the graft copolymer is incorporated into a poly(oxyethylene)$_n$ methacrylate backbone by random copolymerization of poly(dimethyl siloxane) monomethacrylate macromonomer (PDMSMA) with poly(oxyethylene)$_n$ methacrylate monomers to form a graft copolymer of type POEM-g-PDMS. In preferred embodiments, poly(oxyethylene)$_9$ methacrylate monomers are reacted to form the POEM-g-PDMS copolymer.

In some embodiments, the "A" backbone includes additional monomers. In some embodiments the additional monomers are anionic. In an embodiment, poly(oxyethylene)$_9$ methacrylate monomers are copolymerized with methacrylate monomers (MAA) and with PDMSMA to form poly(oxyethylene)$_9$-ran-MAA-g-PDMS. In an embodiment, the carboxylic acid groups of this polymer are reacted with $BF_3$ to give anionic boron trifluoride esters, which have a reduced tendency to complex lithium ions when compared with MAA carboxylate groups.

As summarized by the manufacturing steps shown in FIG. 2, in some embodiments, a lithium metal electrode coated with a lithium ion conductive conformable polymer is manufactured and inserted into a cell to function as a negative electrode (the metal) and a solid electrolyte (the polymer) in a lithium metal battery.

The steps of this embodiment are as follows: First, prepare a solution of the lithium ion conductive conformable polymer in a solvent. If the conformable polymer is a block or graft copolymer, a suitable solvent is a cosolvent capable of dissolving both A and B segments 2. Second, coat an electrically conductive substrate with the conformable polymer, for example by dipping the substrate in the conformable polymer solution, or by spin-coating the substrate with the conformable polymer solution, or by some other coating method 4. Third, evaporate the solvent to leave the electrolytically conductive substrate coated with conformable polymer 6. Next, insert the conformable polymer-coated conductive substrate as a cathode in an electrolytic cell, the electrolytic cell including an anode and a lithium salt solution 8. Then, apply voltage across the anode and the substrate, acting as a cathode, causing lithium ions to selectively electrophorese through the copolymer coating, to be reduced at the substrate surface, thereby electrolytically plating lithium metal onto the surface 10. Because of the selective electrophoresis of lithium ions, other cations in solution are blocked from electrophoresing to and electroplating on the substrate surface. As lithium metal plates, the conformable polymer coating deforms, allowing the conformable polymer coating to continue to cover the growing layer of lithium metal, resulting in a final product for which the substrate is coated with a layer of lithium metal, and the layer of lithium metal is in turn coated with a layer of conformable polymer solid electrolyte. In the final step, the conductive substrate layered with lithium metal and the conformable polymer solid electrolyte is inserted as the combined lithium metal negative electrode and solid electrolyte in a lithium metal battery 12.

FIG. 3a shows a cross-section and FIG. 3b shows a top view of a conformable polymer coated electrically conductive substrate 115 according to embodiments of the invention. Following the process of coating the electrically conductive substrate 110 with a solvent solution of conformable polymer and drying, the centrally located electrically conductive substrate 110 is surrounded by a layer of conformable polymer solid electrolyte 160. FIG. 4a shows a cross-section and FIG. 4b shows a top view of the conformable polymer coated lithium metal electrode 116 that can be obtained following the electrolytic plating onto the electrically conductive substrate 110 of a layer of lithium metal 150 which fills the space between the conductive substrate 110 and the conformable polymer solid electrolyte 160.

In the embodiment shown in FIGS. 5a, 5b, 6a, and 6b, the conformable polymer coated lithium metal electrode 116 can be obtained by first preparing, by electroplating or by other means, a lithium plated conductive substrate 117, then dipping this substrate in or spin-coating this substrate with a conformable polymer solution and drying the lithium plated substrate to obtain a copolymer coated negative electrode 115. FIG. 5a shows a cross-section and FIG. 5b shows a top view of a lithium coated conductive substrate 117 prior to coating with the conformable polymer solid electrolyte 160. FIG. 6a shows a cross-section and FIG. 6b shows a top view of the conformable polymer coated lithium metal electrode 116 after coating the lithium coated conductive substrate 117 with the conformable polymer solid electrolyte.

In preferred embodiments, the lithium metal in the conformable polymer coated lithium metal electrode 116 is ultrapure, having no more than five ppm of non-metallic elements by mass. In some embodiments, the lithium metal in the conformable polymer coated lithium metal electrode 116 includes no more than one ppm of non-metallic elements by mass. Typical non-metallic elements that are effectively minimized include nitrogen, phosphorous, and fluorine. In some embodiments the lithium coated conductive substrate 117 is manufactured by methods described in U.S. patent application Ser. Nos. 17/006,048 and 17/006,073, both of which were filed Aug. 28, 2020 and are incorporated by reference herein in their entirety. For such methods, the manufacturing process proceeds under a blanketing atmosphere having no more than 10 ppm of lithium reactive components on a molar basis. For example, the blanketing atmosphere may be an argon atmosphere, wherein the argon has a purity of greater than 99.998 weight percent. Notably, nitrogen is a common lithium reactive atmospheric component, reacting with lithium metal to form lithium nitride.

In preferred embodiments, the conductive substrate is selected from the group consisting of copper, aluminum, graphite coated copper, and nickel. In a some embodiments, the solvent is tetrahydrofuran (THF).

In some embodiments, the conformable polymer is the block copolymer POEM-b-PBMA. In some embodiments, the ratio of POEM to PBMA is greater than 50:50 on a molar basis. In preferred embodiments, the ratio of POEM to PBMA is between 55:45 and 70:30 on a molar basis.

In some embodiments, the conformable polymer is the graft copolymer poly[(oxyethylene)$_9$ methacrylate]-g-poly (dimethyl siloxane).

Figure 7:
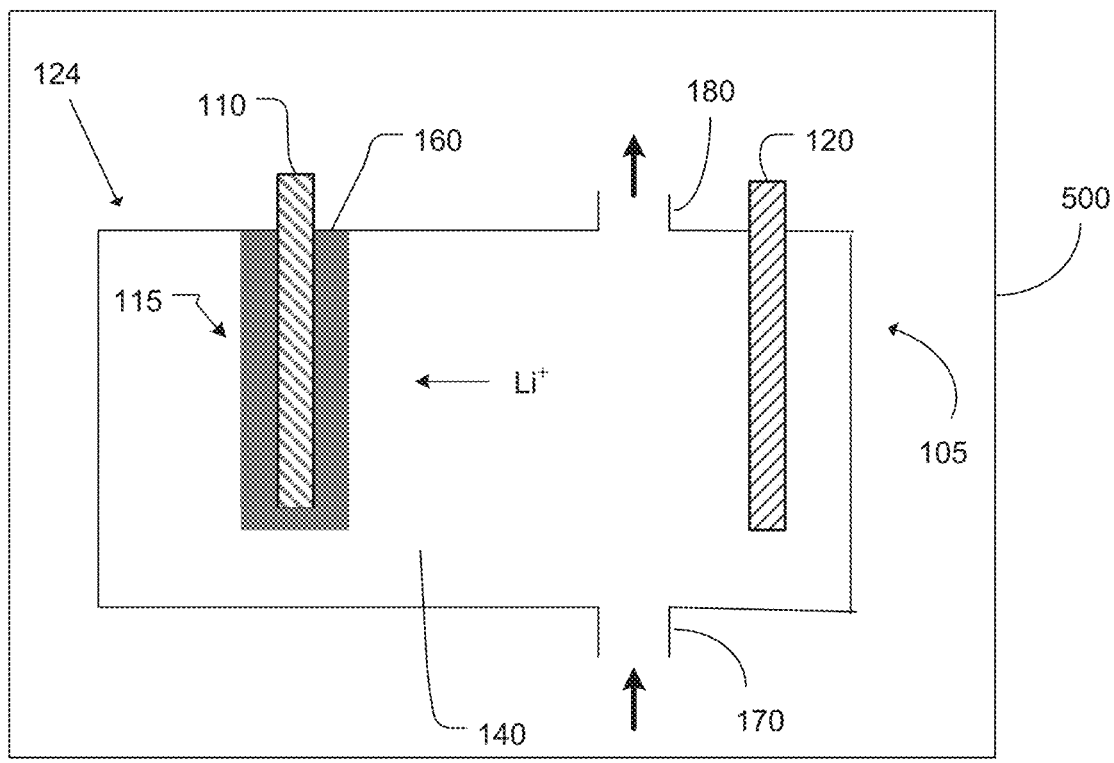
FIG. 7 shows an electrolytic cell suitable for manufacturing the copolymer coated lithium metal electrode according to embodiments of the invention, prior to electroplating of lithium onto the conductive substrate. In this cell the lithium salt solution is replenished by the flow of lithium salt solution into the cell.
Figure 8:
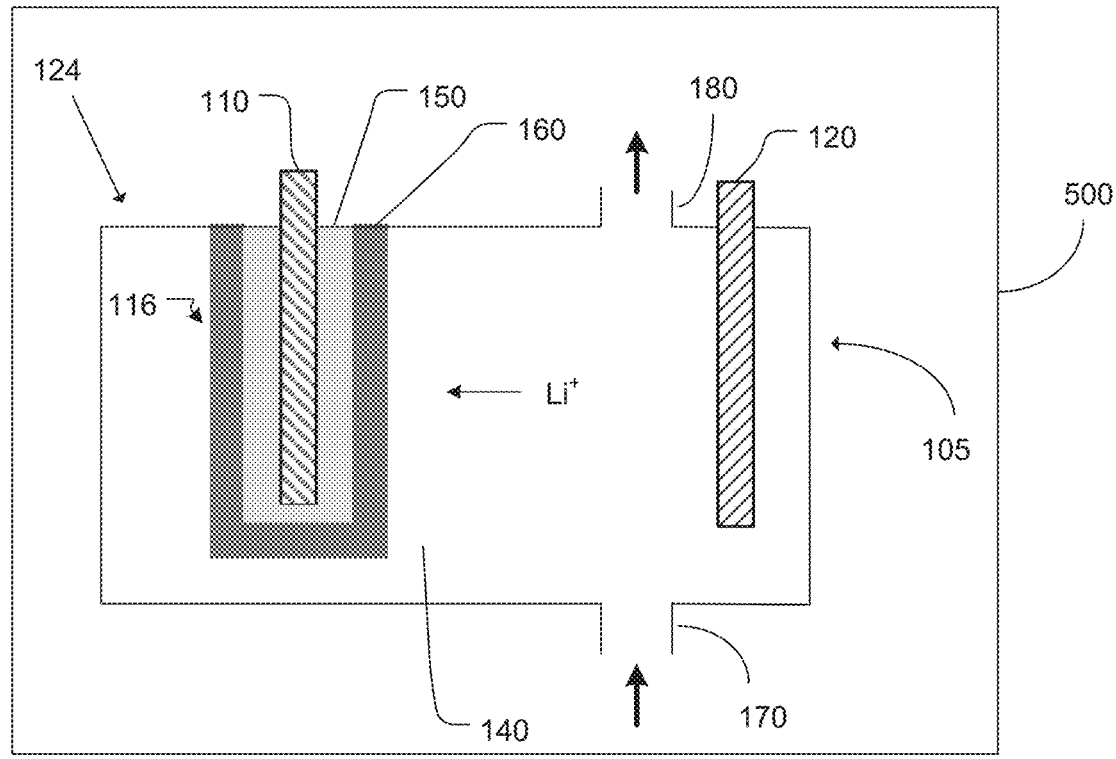
FIG. 8 shows the electrolytic cell of FIG. 7 following electroplating of lithium onto the conductive substrate.

An embodiment of an electrolytic cell 105 for electroplating the electrically conductive substrate 110 with a layer of lithium metal 150 sandwiched between the conductive substrate 110 and the conformable polymer coating 160 is shown in FIG. 7 (before electroplating) and FIG. 8 (after electroplating). In manufacturing the conformable polymer coated lithium metal electrode 116, the conformable polymer coated electrically conductive substrate 115 is positioned as the cathode in the electrolytic cell 105. As shown in FIG. 7, the electrolytic cell 105 contains an anode 120 and a lithium salt solution 140 in contact with the anode 120 and with the conformable polymer 160 coating the conductive substrate 110.

In some embodiments, the electrolytic cell 105 is configured as a flow chamber, with an entrance port 170 and an exit port 180 allowing lithium salt solution 140 to enter the electrolytic cell 105 to provide a renewable supply of lithium ions for electroplating. In some embodiments, the electrolytic cell is completely blanketed with a blanketing atmosphere 124, the blanketing atmosphere being substantially free of lithium reactive components. In a preferred embodiment, the blanketing atmosphere includes no more than 10 ppm of lithium reactive components on a molar basis. In a preferred embodiment, the blanketing atmosphere includes no more than 5 ppm of lithium reactive components on a molar basis. In a preferred embodiment, the blanketing atmosphere includes no more than 10 ppm of nitrogen on a per molar basis. In a preferred embodiment, the blanketing atmosphere includes no more than 5 ppm of nitrogen on a per molar basis. In some embodiments, the blanketing atmosphere includes no more than 1 ppm of nitrogen on a per molar basis. In a preferred environment, the blanketing atmosphere comprises argon with a purity of greater than 99.998 weight percent. In some embodiments the blanketing atmosphere 124 and the electrolytic cell 105 are enclosed in a gas-impermeable container 500.

According to embodiments of the invention, by using the lithium ion selective membrane during electroplating and by using a blanketing atmosphere having less than 10 ppm of lithium reactive components, the goal is achieved of having less than 5 ppm, and in some cases less than 1 ppm of non-metallic impurities associated with the lithium layer, such non-metallic impurities including nitrogen, phosphorous, and fluorine.

As shown in FIG. 8, in some embodiments, during electroplating a voltage is applied across the anode 120 and the conductive substrate 110 of the electrolytic cell 105, causing electrons to flow through an external circuit to the conductive substrate 110 and pulling lithium ions from the lithium salt solution 140 into the conformable polymer layer, and causing the lithium ions to selectively electrophorese through the conformable polymer layer 160 to plate onto the surface of the conductive substrate, forming a layer of lithium metal 150 sandwiched between the conductive substrate 110 and the conformable polymer 160. As the layer of lithium metal 150 grows, the conformable polymer 160 molecular structure rearranges to maintain contact with the surface of the layer of lithium metal 150. In the process, a conformable polymer coated lithium metal electrode 116 is manufactured.

Figure 9:
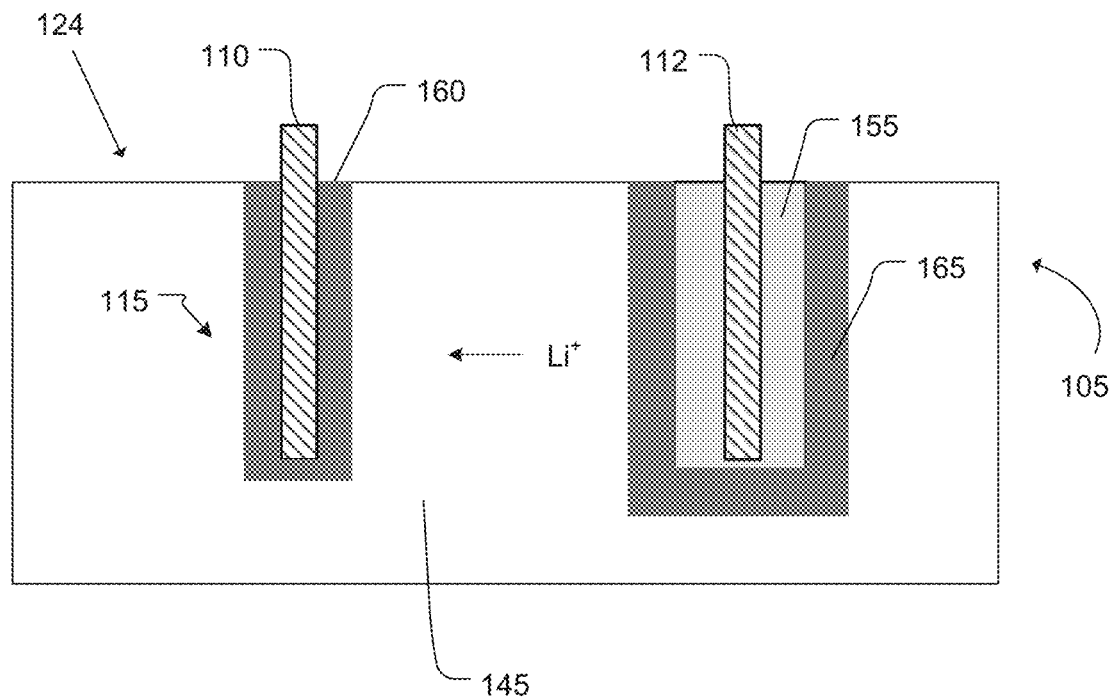
FIG. 9 shows an electrolytic cell suitable for manufacturing the copolymer coated lithium metal electrode according to embodiments of the invention, prior to electroplating of lithium onto the conductive substrate. In this cell lithium ion in the lithium salt solution is replenished by oxidation of lithium at the lithium positive electrode.
Figure 10:
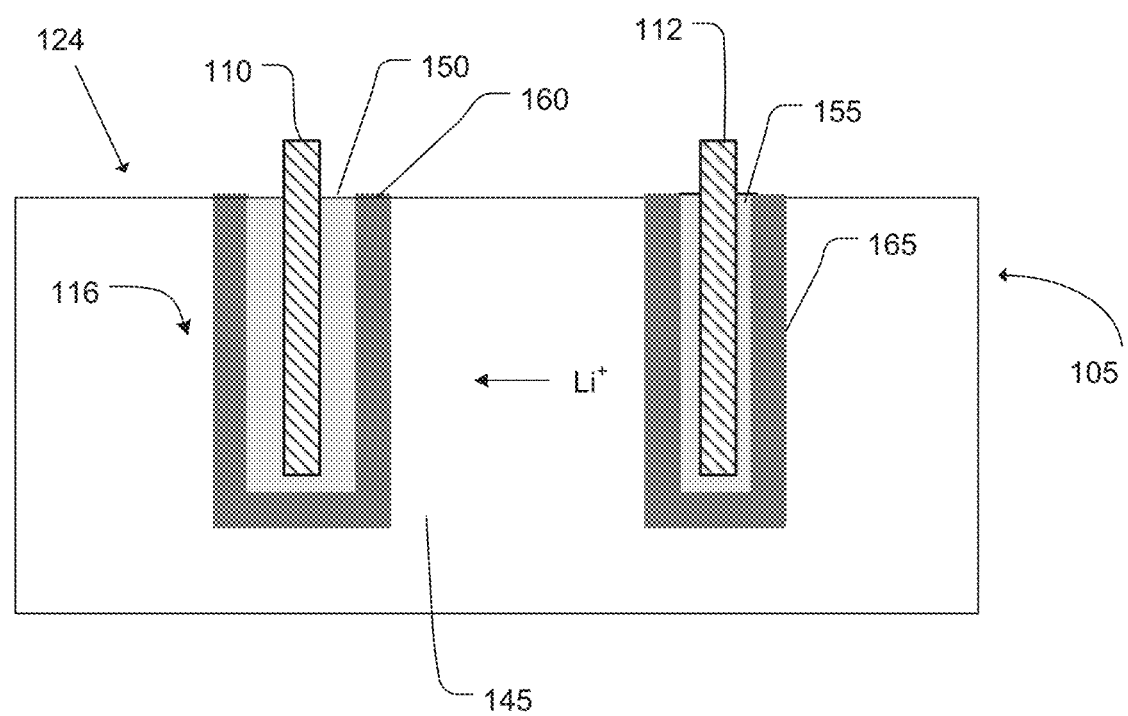
FIG. 10 shows the electrolytic cell of FIG. 9 following electroplating of lithium onto the conductive substrate.

As shown in FIGS. 9 and 10, in a first embodied method of purifying lithium, the electrolytic cell 105 includes a negative electrode comprising a first conductive substrate 110 coated with conformable polymer 160, to be electroplated with a first layer of lithium metal 150, and a positive electrode 120 with a second conductive substrate 112 in physical contact with a second layer of lithium metal 155, the second layer of lithium metal 155 coated with conformable polymer 165. Separating the negative electrode and the positive electrode is a lithium salt solution 145. As voltage is applied across the electrodes, the second layer of lithium metal 155 releases lithium ions through the conformable polymer coating into the lithium salt solution 145, replenishing the supply of lithium ions as electroplating of purified lithium metal occurs on the surface of the first conductive substrate 110. Consequently, as shown in FIG. 10, as the layer of lithium metal 150 sandwiched between the first conductive substrate 110 and the conformable polymer 160 increases in thickness, the second layer of lithium metal 155 sandwiched between the second conductive substrate 112 and the conformable polymer 165 decreases in thickness.

Figure 11:
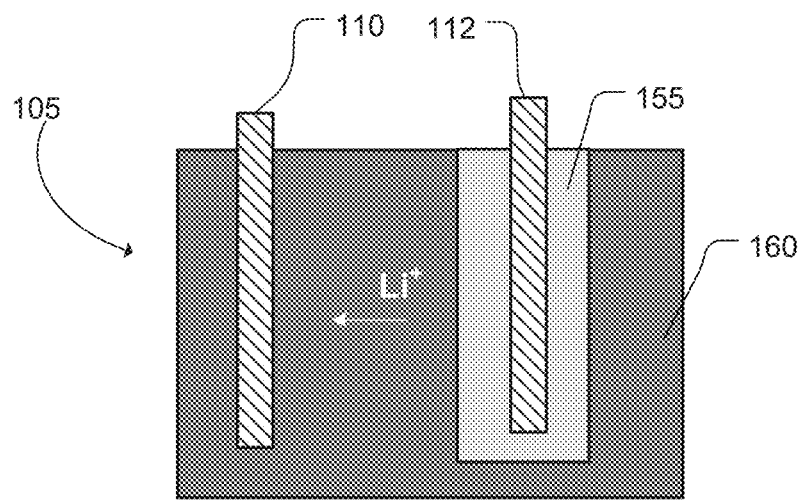
FIG. 11 shows an electrolytic cell with a copolymer solid electrolyte suitable for electroplating lithium metal onto a conductive substrate according to embodiments of the invention.
Figure 12:
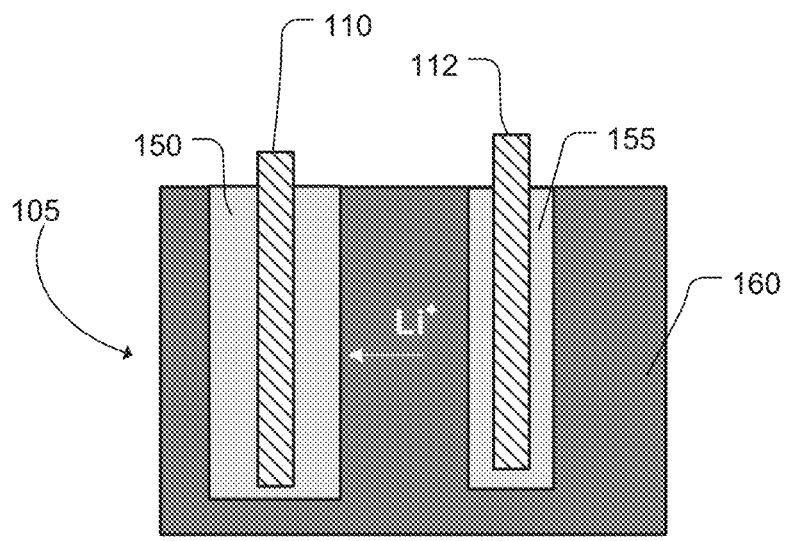
FIG. 12 shows the electrolytic cell of FIG. 11 following electroplating of lithium metal onto the conductive substrate.

In a second purification method, embodied in FIGS. 11 and 12, an electrolytic cell 105 includes a first conductive substrate 110 functioning as a cathode, onto which a first layer of lithium metal is to be plated, and an anode made of a second conductive substrate 112 coated with a second layer of lithium metal, the second layer of lithium metal 155 having impurities associated therewith. Separating the two electrodes is a lithium ion conducting conformable polymer 160. Lithium salt is dispersed in the lithium ion conducting conformable polymer. As voltage is applied across the electrodes, electrons flow through an external circuit from the second conductive substrate to the first conductive substrate 110, causing the second layer of lithium metal 155 to release lithium ions, which flow through the lithium ion conducting conformable polymer 160 to the first conductive substrate, where they are reduced, electroplating the first layer of lithium metal 150 on the surface of the first conductive substrate 110. Consequently, as shown in FIG. 12, as the first layer of lithium metal 150 on the first conductive substrate 110 increases in thickness, the second layer of lithium metal on the second conductive substrate 112 decreases in thickness. As lithium metal leaves the anode and plates onto the cathode, the lithium ion conducting conformable polymer adjusts shape to maintain contact with the first layer of lithium metal 150 and second layer of lithium metal 155.

An advantage of the two methods embodied in FIGS. 9-12 is that the electroplated first layer of lithium metal 150 will be of higher purity and will have a smoother surface than the electroplating second layer of lithium metal 155. The methods thus provides straightforward means of purifying lithium metal and of directly obtaining high purity, microscopically smooth lithium metal electrodes to use in lithium metal batteries, starting with lower purity, microscopically rougher lithium metal. When the two methods are performed under a blanketing atmosphere with less than 10 ppm of lithium reactive components, the level of both metallic and non-metallic impurities can be reduced.

Figure 13:
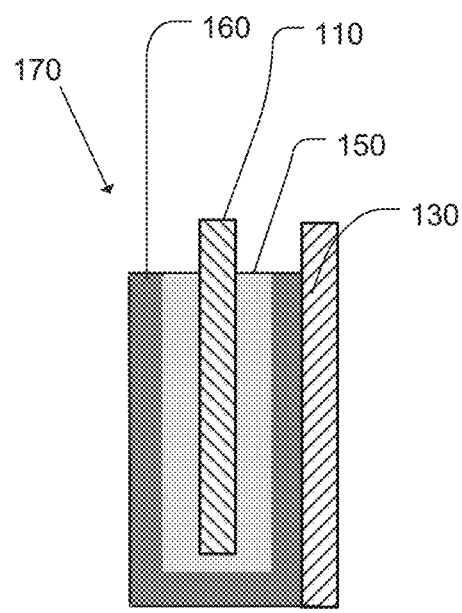
FIG. 13 shows a cross-section of a rechargeable battery constructed with the polymer coated lithium metal electrode according to an embodiment of the invention. The battery in this embodiment includes a single positive electrode.
Figure 14:
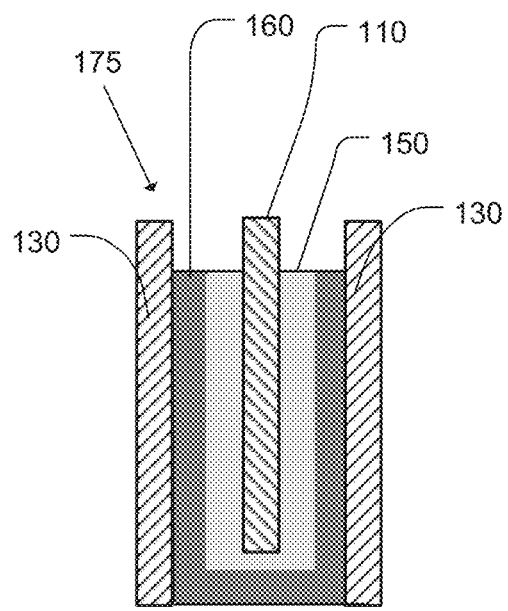
FIG. 14 shows a cross-section of a rechargeable battery constructed with the polymer coated lithium metal electrode according to an embodiment of the invention. The battery in this embodiment includes two positive electrodes.
Figure 15:
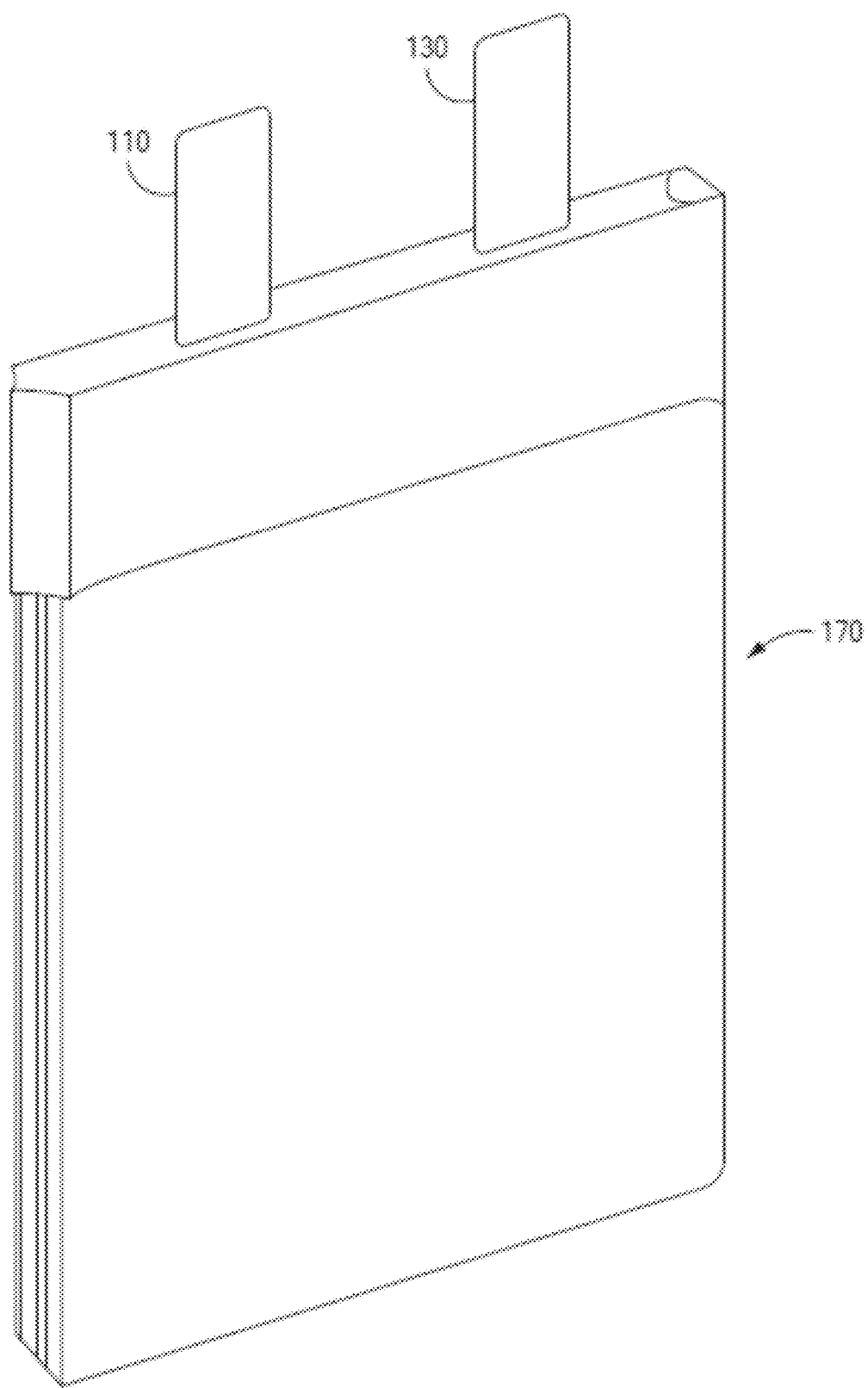
FIG. 15 shows an exterior view of the rechargeable battery embodied in FIG. 11.
Figure 16:
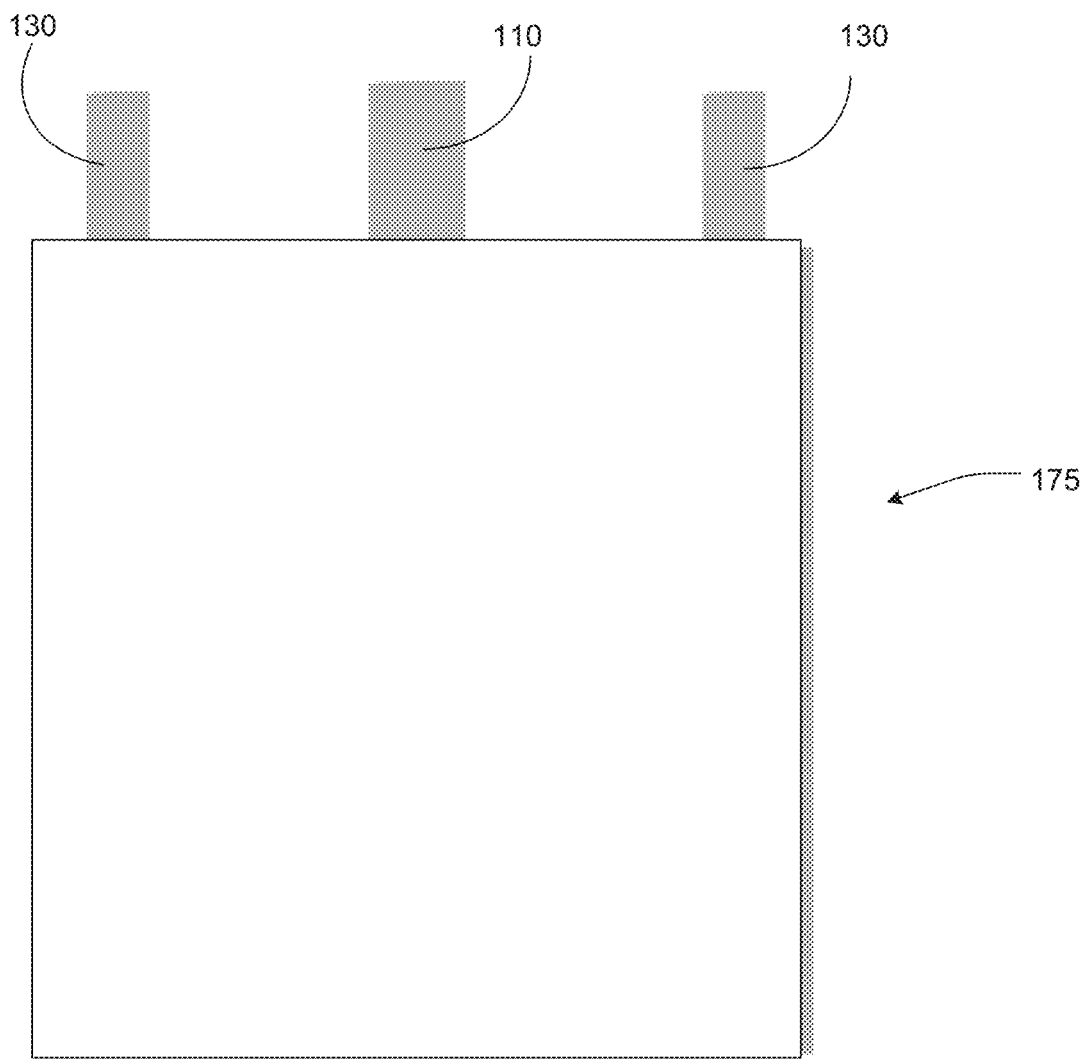
FIG. 16 shows an exterior view of the rechargeable battery embodied in FIG. 12.

The conformable polymer coated lithium metal electrode 116, prepared by electrolytic or other methods, can be inserted directly into a rechargeable lithium battery, shown in cross-section in FIGS. 13 and 14, with exterior views in FIGS. 15 and 16, respectively.

In the battery embodied in FIGS. 13 and 15, a single positive electrode 130 is directly juxtaposed against the outer layer of conformable polymer 160 coating the negative electrode, to form a rechargeable battery 170 with the conformable polymer 160 providing the solid state electrolyte.

In the battery embodied in FIGS. 14 and 16, two positive electrodes 130 are directly juxtaposed against two sides of the outer layer of conformable polymer 160 coating the negative electrode, to form a rechargeable battery 175 with the conformable polymer 160 providing the solid state electrolyte.

In embodiments of the batteries of FIGS. 13-16, a lithium salt is dispersed within the conformable polymer. In some embodiments, the lithium salt is chosen from the group consisting of $LiCF_3SO_3$, LiFSI, LiTFSI, LiBOB, LiF, $LiPF_6$, $LiNO_3$, and combinations thereof. In some embodiments, the lithium salt is $LiCF_3SO_3$. In some embodiments $LiCF_3SO_3$ is dispersed within the conformable polymer at a molar ratio of between 50:1 and 10:1 ethylene oxide to lithium ion. In some embodiments, the $LiCF_3SO_3$ is dispersed within the conformable polymer at a molar ratio of 20:1 ethylene oxide to lithium ion. In some embodiments, the conformable polymer with dispersed lithium salt coating the negative electrode is formed by solution casting directly from anhydrous THF.

In some embodiments the rechargeable batteries of FIGS. 13-16 are Li—S batteries, for which the positive electrode includes elemental sulfur. In preferred embodiments, the sulfur in the positive electrode is associated with a conductive matrix, enabling suitably high electron conductivity.

Li—S batteries constructed in the manner of FIGS. 13-16 enable $Li^+$ transport, but block the transport of anions, including in particular polysulfide anions. Consequently, the polysulfide shuttle responsible for reducing the performance and cycle life of Li—S batteries is vitiated.

Example: A Recyclable Battery with Conformable Graft Copolymer

A lithium metal battery was constructed using a copper substrate as the negative electrode, the copper substrate being spin-coated with a solution of 10% POEM-g-PDMS, dissolved in THF with LiTFSI added at an EO/Li ratio of 20. The positive electrode was an NMC electrode. The battery construction involved pressing together the spin coated copper substrate so that the positive and negative electrodes were separated by the POEM-g-PDMS, the POEM-g-PDMS providing a solid electrolyte for the battery.

In performing the spin coating, 50 microliters of the polymer solution was dropped onto a face of a cleaned, bare copper substrate, the face being a 1" diameter circle. The copper substrate was attached to a spin coater, spun at 3,000 rpm and allowed to dry.

Figure 17:
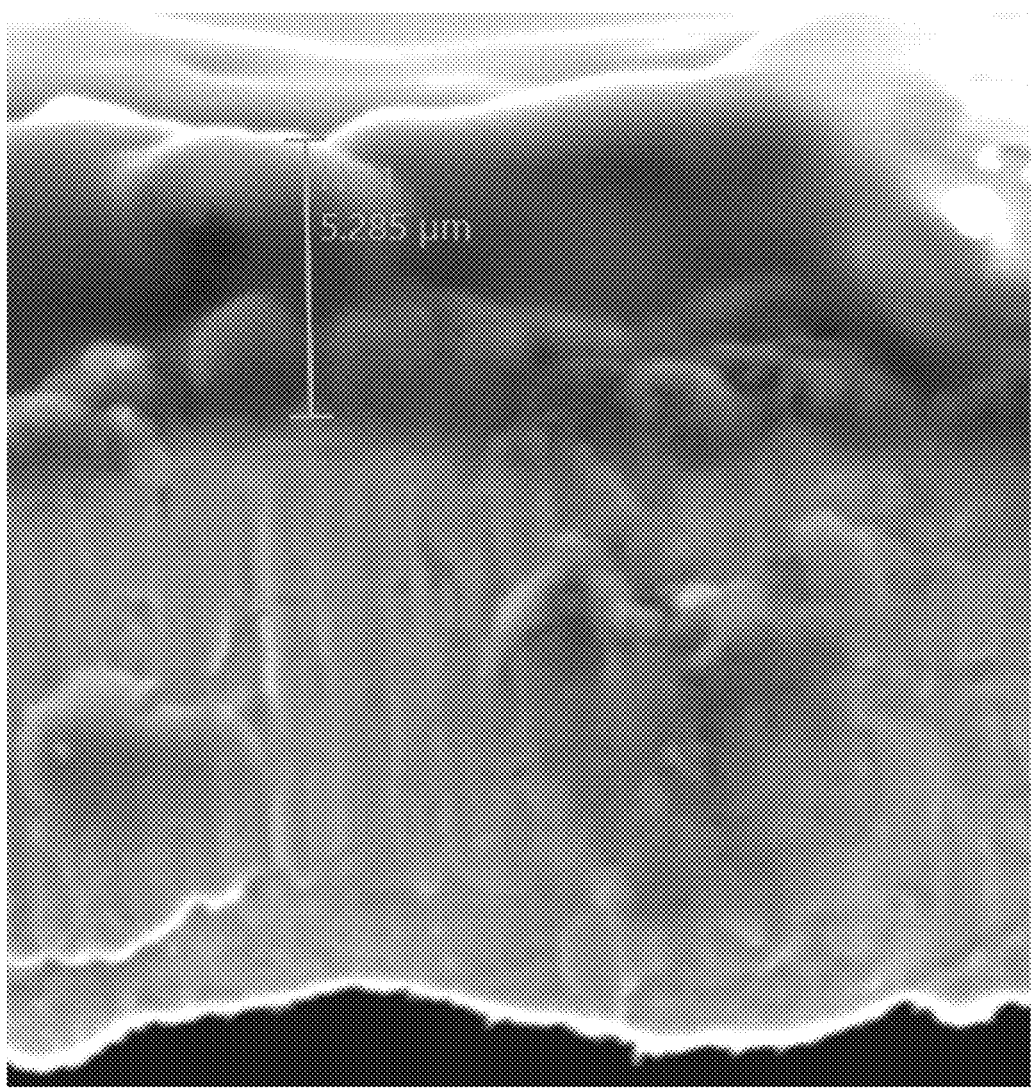
FIG. 17 shows electron microscopy of a cross section of a conductive substrate spin-coated with graft copolymer poly[(oxyethylene)$_9$ methacrylate]-g-poly(dimethyl siloxane).

As shown in FIG. 17, the spin coating method provided an ultrathin coating of approximately 5 microns in depth over the surface of the copper substrate. The ultrathin coating has the advantage of reducing cost and decreasing cell overpotential.

Figure 18:
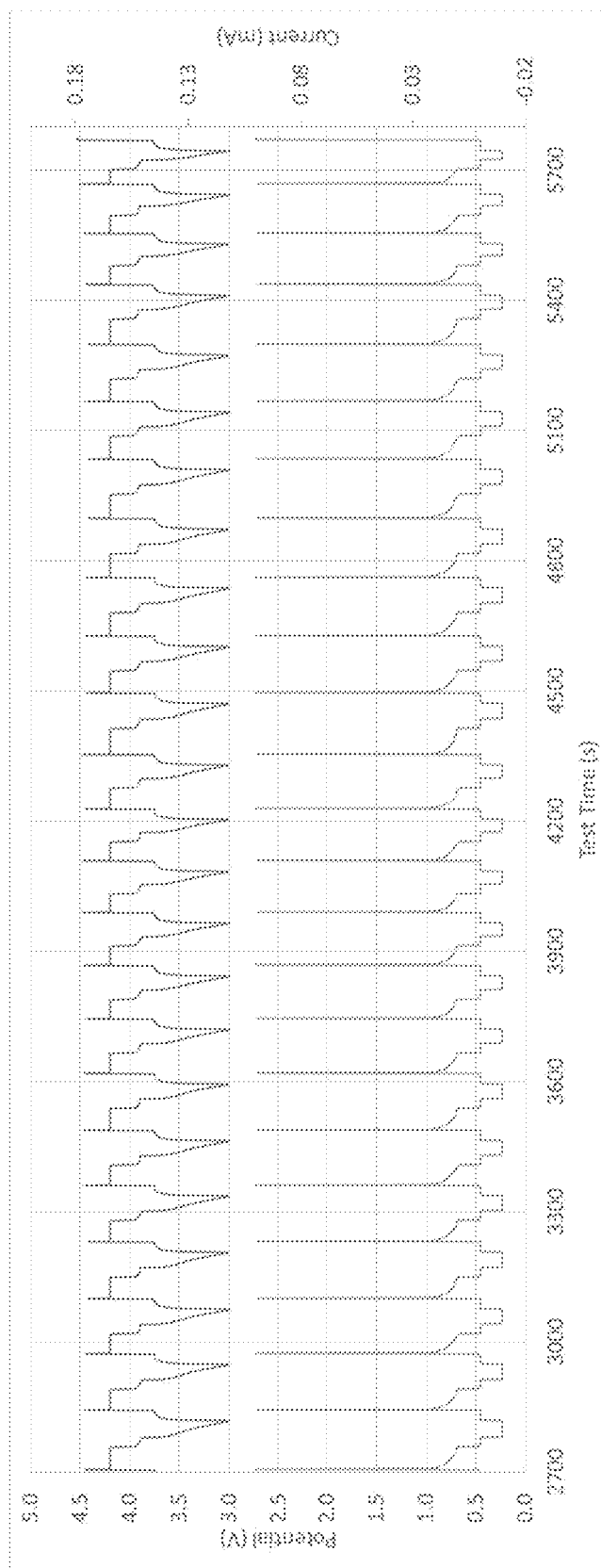
FIG. 18 shows the time dependence of voltage and current during cycling of a lithium metal battery manufactured according embodiments of the invention.

Surprisingly, as shown in FIG. 18, even with this ultrathin coating, the battery maintains consistent charge-discharge capacity over multiple cycles, with no noticeable degradation over the course of more than 100 cycles, with 24 representative cycles shown. Capacity remained consistent during the course of cycling.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A rechargeable battery comprising a lithium metal electrode,
   wherein the lithium metal electrode comprises (i) a first layer of lithium metal adjacent to a first surface of a substrate, (ii) a second layer of lithium metal adjacent to a second surface of the substrate, and (iii) a lithium ion conductive polymer adjacent to the first layer of lithium metal and the second layer of lithium metal, wherein the first surface of the substrate is opposite to the second surface of the substrate, and wherein the first layer of lithium metal and the second layer of lithium metal are provided as a continuous layer of lithium metal,
   wherein the lithium ion conductive polymer comprises a first domain and a second domain, wherein the first domain and the second domain are immiscible with one another,
   wherein the first domain of the lithium ion conductive polymer is configured to solvate lithium ions and to provide one or more continuous conductive pathways for transport of the lithium ions, thereby selectively allowing the lithium ions to pass through the lithium ion conductive polymer, and wherein the second domain of the lithium ion conductive polymer is configured to prevent a solvent from passing through the lithium ion conductive polymer and contacting the layer of lithium metal, and
   wherein the rechargeable battery is configured to maintain a charge-discharge capacity over at least 100 cycles when cycled with a potential window of 1.5 V.

2. The rechargeable battery of claim 1, wherein the lithium metal electrode has less than 5 parts per million (ppm) of one or more non-metallic impurities.

3. The rechargeable battery of claim 1, wherein the lithium ion conductive polymer is configured to maintain contact with the first layer of lithium metal or the second layer of lithium metal by at least in part adapting to volume changes in the first layer of lithium metal or the second layer of lithium metal.

4. The rechargeable battery of claim 1, wherein the lithium ion conductive polymer is configured to maintain contact with the first layer of lithium metal or the second layer of lithium metal by at least in part adapting to volume changes caused by electrodeposition of the first layer of lithium metal or the second layer of lithium metal.

5. The rechargeable battery of claim 1, wherein the first layer of lithium metal and the second layer of lithium metal are free of lithium nitride.

6. The rechargeable battery of claim 1, wherein the lithium ion conductive polymer has a thickness of at least 5 microns.

7. The rechargeable battery of claim 1, wherein the lithium ion conductive polymer has a thickness of at most 5 microns.

8. The rechargeable battery of claim 1, wherein the lithium ion conductive polymer is doped with a lithium salt.

9. The rechargeable battery of claim 1, wherein the lithium ion conductive polymer comprises an elastomer.

10. The rechargeable battery of claim 1, wherein the lithium ion conductive polymer comprises a block or graft copolymer.

11. The rechargeable battery of claim 10, wherein the first domain and the second domain are microphase separated.

12. The rechargeable battery of claim 1, wherein the substrate comprises a conductive substrate.

13. The rechargeable battery of claim 12, wherein the conductive substrate comprises copper, aluminum, graphite coated copper, or nickel.

14. The rechargeable battery of claim 1, wherein the second domain of the lithium ion conductive polymer comprises one or more poly (alkyl methacrylate) segments.

15. The rechargeable battery of claim 1, wherein the second domain of the lithium ion conductive polymer comprises one or more poly (dimethyl siloxane) segments.

16. The rechargeable battery of claim 1, wherein the first domain of the lithium ion conductive polymer comprises one or more poly (oxyethylene) segments.

17. The rechargeable battery of claim 1, wherein the first domain and the second domain comprise different materials.

18. The rechargeable battery of claim 1, wherein the solvent comprises water.

19. The rechargeable battery of claim 1, wherein the first layer of lithium metal and the second layer of lithium metal have less than 5 parts per million (ppm) of one or more non-metallic impurities.

20. The rechargeable battery of claim 19, wherein the one or more non-metallic impurities comprises nitrogen.

21. The rechargeable battery of claim 1, wherein the first layer of lithium metal is coupled to the first surface of the substrate and to the lithium ion conductive polymer, and wherein the second layer of lithium metal is coupled to the second surface of the substrate and to the lithium ion conductive polymer.

22. The rechargeable battery of claim 1, wherein the substrate is not made of lithium.

23. The rechargeable battery of claim 2, wherein the one or more non-metallic impurities comprises nitrogen.

* * * * *